US010144791B2

(12) United States Patent
Klosin et al.

(10) Patent No.: US 10,144,791 B2
(45) Date of Patent: *Dec. 4, 2018

(54) MOLECULAR WEIGHT CONTROL OF POLYOLEFINS USING HALOGENATED BIS-PHENYLPHENOXY CATALYSTS

(71) Applicant: Dow Global Technologies LLC, Midland, MI (US)

(72) Inventors: Jerzy Klosin, Midland, MI (US); Ruth Figueroa, Midland, MI (US); Robert D J Froese, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,198

(22) Filed: Feb. 15, 2017

(65) Prior Publication Data

US 2017/0158790 A1    Jun. 8, 2017

Related U.S. Application Data

(62) Division of application No. 14/781,419, filed as application No. PCT/US2014/044374 on Jun. 26, 2014, now Pat. No. 9,605,098.

(60) Provisional application No. 61/840,624, filed on Jun. 28, 2013.

(51) Int. Cl.
*C08F 4/76* (2006.01)
*C08F 4/64* (2006.01)
*C08F 210/16* (2006.01)
*C08F 4/659* (2006.01)

(52) U.S. Cl.
CPC ............ *C08F 210/16* (2013.01); *C08F 4/659* (2013.01); *C08F 4/65908* (2013.01); *C08F 4/65912* (2013.01)

(58) Field of Classification Search
CPC .................................................. C08F 4/65908
See application file for complete search history.

(56) References Cited

U.S. PATENT DOCUMENTS

| | | | |
|---|---|---|---|
| 5,064,802 A | 11/1991 | Stevens et al. | |
| 5,153,157 A | 10/1992 | Hlatky et al. | |
| 5,296,433 A | 3/1994 | Siedle | |
| 5,321,106 A | 6/1994 | Lapointe | |
| 5,350,723 A | 9/1994 | Neithamer et al. | |
| 5,425,872 A | 6/1995 | Devore et al. | |
| 5,625,087 A | 4/1997 | Devore et al. | |
| 5,721,185 A | 2/1998 | Lapointe et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 6,103,657 A | 8/2000 | Murray | |
| 6,696,379 B1 | 2/2004 | Carnahan et al. | |
| 6,869,904 B2 | 3/2005 | Boussie et al. | |
| 7,060,848 B2 | 6/2006 | Boussie et al. | |
| 7,163,907 B1 | 1/2007 | Canich et al. | |
| 7,951,882 B2 | 5/2011 | Arriola et al. | |
| 8,609,794 B2 * | 12/2013 | Klosin | .............. C08F 10/00 502/103 |
| 8,729,201 B2 | 5/2014 | Fontaine et al. | |
| 9,029,487 B2 | 5/2015 | Klosin et al. | |
| 9,102,819 B2 | 8/2015 | Kapur et al. | |
| 9,522,855 B2 | 12/2016 | Klosin | |
| 9,527,940 B2 | 12/2016 | Demirors et al. | |
| 9,527,941 B2 | 12/2016 | Demirors et al. | |
| 9,601,231 B2 * | 3/2017 | Klosin | .............. C08F 10/00 |
| 9,605,098 B2 * | 3/2017 | Klosin | |
| 9,643,900 B2 * | 5/2017 | Arriola | ................ C07C 2/34 |
| 2004/0005984 A1 | 1/2004 | Boussie et al. | |
| 2011/0039082 A1 | 2/2011 | Yun et al. | |
| 2011/0082249 A1 | 4/2011 | Shan et al. | |
| 2011/0282018 A1 | 11/2011 | Klosin et al. | |
| 2014/0330056 A1 | 11/2014 | Klosin et al. | |
| 2014/0357918 A1 | 12/2014 | Klosin et al. | |
| 2015/0337062 A1 | 11/2015 | Demirors et al. | |
| 2015/0337063 A1 | 11/2015 | Demirors et al. | |
| 2015/0344601 A1 | 12/2015 | Demirors et al. | |
| 2015/0344602 A1 | 12/2015 | Demirors et al. | |

FOREIGN PATENT DOCUMENTS

| | | |
|---|---|---|
| CN | 102712795 A | 10/2012 |
| GB | 1069848 A | 5/1967 |
| JP | 2000159829 A | 6/2000 |
| JP | 2001525859 A | 12/2001 |
| JP | 2005523921 A | 8/2005 |
| JP | 2011525212 A | 9/2011 |
| JP | 2013521382 A | 6/2013 |
| JP | 2013534934 A | 9/2013 |
| JP | 2013541631 A | 11/2013 |
| JP | 2013544940 A | 12/2013 |
| WO | 2007136494 A2 | 11/2007 |
| WO | 2007136496 A2 | 11/2007 |
| WO | 2010061630 A1 | 6/2010 |
| WO | 2011025784 A1 | 3/2011 |
| WO | 2011041696 A1 | 4/2011 |
| WO | 2011109563 A2 | 9/2011 |

(Continued)

OTHER PUBLICATIONS

G. Soave, "Redlick-Kwong-Soave (RKS) Equation of State," Chemical Engineering Science, 1972, vol. 27, pp. 1197-1203.

(Continued)

*Primary Examiner* — Rip A Lee
(74) *Attorney, Agent, or Firm* — Dinsmore & Shohl LLP

(57) ABSTRACT

A process for preparing an olefin homopolymer or copolymer comprises contacting ethylene, an alpha-olefin, or a combination, and a catalytic amount of a metal-ligand complex catalyst of a particular formula that requires at least one halogen atom that is ortho to a bridging moiety. The strategic location of the halogen atom(s) ensures a product having a molecular weight that is predictably and significantly reduced in comparison with that of copolymers produced using otherwise identical metal-ligand complex catalysts that lack halogen atoms at the specified sites.

11 Claims, No Drawings

(56) References Cited

FOREIGN PATENT DOCUMENTS

| WO | 2011146044 A1 | 11/2011 | | |
|---|---|---|---|---|
| WO | 2011146291 A1 | 11/2011 | | |
| WO | WO 2011/146291 A1 * | 11/2011 | ............ | C08F 210/16 |
| WO | 2012004683 A2 | 1/2012 | | |
| WO | 2012027448 A1 | 3/2012 | | |
| WO | 2012064630 A2 | 5/2012 | | |
| WO | 2013101375 A1 | 7/2013 | | |
| WO | 2014105411 A1 | 7/2014 | | |
| WO | 2014105412 A1 | 7/2014 | | |
| WO | 2014105413 A1 | 7/2014 | | |
| WO | 2014209927 A1 | 12/2014 | | |
| WO | 2015045928 A1 | 4/2015 | | |
| WO | 2015045930 A1 | 4/2015 | | |

OTHER PUBLICATIONS

Synthesis 1979, 49-50.
PCT/US2014/044374, International Search Report and Written Opinion dated Aug. 28, 2014.
PCT/US2014/044374, International Search Report and Written Opinion dated Jan. 7, 2016.
Chinese Office Action pertaining to Chinese Patent Application Serial No. 201480033642.X dated Nov. 1, 2017.
European Search Report pertaining to European Patent Application Serial No. 14741484.1 dated Aug. 24, 2017.
Office Action dated Apr. 16, 2018 pertaining to U.S. Appl. No. 15/357,931, 8 pages.
International Preliminary Report on Patentability pertaining to PCT/US2016/054088 dated Apr. 3, 2018.
International Preliminary Report on Patentability pertaining to PCT/US2016/054285 dated Apr. 3, 2018.
International Search Report and Written Opinion pertaining to PCT/US2016/054088 dated Dec. 19, 2016.
International Search Report and Written Opinion pertaining to PCT/US2016/054285 dated Dec. 21, 2016.
Balke et al.., Chromatography of Polymers, Chapter 13, pp. 199-219 (1992).
Bonvonsombat et al., "Regioselective Iodination of Phenol and Analogues Using N-Iodosuccinimide and p-toluenesulfonic Acid", Tetrahedrom Letters, 2009, 50: 22, 2664-2667.
Chinese Office Action dated Aug. 22, 2016 pertaining to Chinese Application No. 201380067366.4.
Chinese Office Action dated Jan. 25, 2018 pertaining to Chinese Application No. 201380065868.3.
Chinese Office Action dated May 15, 2017 pertaining to Chinese Application No. 201380067366.4.
Chinese Office Action dated May 3, 2017 pertaining to Chinese Application No. 201380065868.3.
Chinese Office Action dated Sep. 1, 2016 pertaining to Chinese Application No. 201380065868.3.
Chinese Office Action dated Nov. 1, 2017 pertaining to Chinese Application No. 201480033642.X.
Chinese Office Action pertaining to Chinese Patent Application No. 201380065667.3 received Oct. 27, 2016.
Chinese Office Action pertaining to Chinese Patent Application No. 201380065848.6 received Sep. 1, 2016.
Chinese Office Action pertaining to Chinese Patent Application No. 201380067367.9 dated May 11, 2017.
Chinese Office Action received Aug. 19, 2016 pertaining to Chinese Patent Application No. 201380067367.9.
EP Communication Pursuant to Rules 161(1) and 162 EPC dated Aug. 4, 2015 for EPO Application No. 13811737.9.
EPO Communication pursuant to Rules 161(1) and 162 EPC dated Aug. 4, 2015 pertaining to European Patent Application No. 13811736.1.
EPO Communication pursuant to Rules 161(1) and 162 EPC dated Aug. 4, 2015 pertaining to European Patent Application No. 13812379.9.
Han et al., "Synthesis of diindeno-Fused 4H-Cyclopenta[def]phenanthren-4-ones and Related Compounds via Benzannulated Enediynyl Propargylic Alcohols", J. Org. Chem., 2005, 70: 6, 2406-2408.
International Preliminary Report on Patentability pertaining to PCT/US2013/0073982 dated Jun. 30, 2015.
International Preliminary Report on Patentability pertaining to PCT/US2013/073976 dated Jun. 30, 2015.
International Preliminary Report on Patentability pertaining to PCT/US2013/073977 dated Mar. 18, 2014.
International Preliminary Report on Patentability pertaining to PCT/US2013/073979 dated Jul. 9, 2015.
International Preliminary Report on Patentability pertaining to PCT/US2013/073980 dated Jun. 30, 2015.
International Preliminary Report on Patentability pertaining to PCT/US2016/040568 dated Jan. 2, 2018.
International Preliminary Report on Patentability pertaining to PCT/US2016/040577 dated Jan. 2, 2018.
International Search Report and Written Opinion pertaining to PCT/US2013/073976 dated Mar. 18, 2014.
International Search Report and Written Opinion pertaining to PCT/US2013/073977 dated Jul. 9, 2015.
International Search Report and Written Opinion pertaining to PCT/US2013/073979 dated Mar. 18, 2014.
International Search Report and Written Opinion pertaining to PCT/US2013/073980 dated Mar. 18, 2014.
International Search Report and Written Opinion pertaining to PCT/US2013/073982 dated Mar. 18, 2014.
International Search Report and Written Opinion pertaining to PCT/US2016/040568 dated Sep. 26, 2016.
International Search Report and Written Opinion pertaining to PCT/US2016/040577 dated Sep. 30, 2016.
Japanese Office Action pertaining to Japan Patent Application No. 2015-550433 dated Jan. 9, 2018.
Japanese Office Action pertaining to Japan Patent Application No. 2015-550434 dated Jan. 9, 2018.
Monrabal et al., Macromol. Symp. 2007, 257, 71-79.
Supplementary Examination Report pertaining to Singapore Patent Application No. 11201503581P dated Sep. 18, 2017.
Thomas H. Mourey and Stephen T. Balke, Chromatography of Polymers, Chapter 12, pp. 180-198, (1992).
Yau, Wallace W., "Examples of Using 3D-GPC-TREF for Polyolefin Characterization", Macromol. Symp., 2007, 257, 29-45.
Zimm, Bruno H., Journal of Chemical Physics, vol. 16, 12, 1099-1116 (1948).
Notice of Allowance pertaining to U.S. Appl. No. 15/357,901, dated May 16, 2018, 29 pages.

* cited by examiner

MOLECULAR WEIGHT CONTROL OF POLYOLEFINS USING HALOGENATED BIS-PHENYLPHENOXY CATALYSTS

REFERENCE TO RELATED APPLICATIONS

This application is filed as a continuation of U.S. Pat. No. 9,605,098, filed on Sep. 30, 2015; which is a national stage entry of PCT/US2014/044374, filed Jun. 26, 2014; which claims priority to U.S. Provisional Application No. 61/840,624, filed on Jun. 28, 2013, the disclosures of which are incorporated herein by reference.

The invention relates to molecular weight control of polyolefins. More particularly, it relates to preparation of ethylene or alpha-olefin homopolymers or ethylene/alpha-olefin copolymers using a particular family of bis-phenylphenoxy catalysts that predictably alter polymer molecular weight.

Polyolefins that are polyethylene polymers, poly(ethylene alpha-olefin) copolymers, and mixtures or blends of such polyolefins are examples of types of polyolefins widely used in industry. They are desirable for making, for example, containers, tubing, films and sheets for packaging, and synthetic lubricants and other utility fluids. The polymerization of ethylene, and polymerization of ethylene and alpha-olefins, by transition metal catalysts is generally known to produce relatively high molecular weight polymers and copolymers. Frequently such polymers and copolymers exhibit molecular weight ranges of greater than 100,000 Daltons (Da), and in some embodiments greater than 500,000 Da. At these molecular weight levels, rheological behavior may be undesirable, however, because the products may not flow as desired and may furthermore tend to crystallize from solution.

Those skilled in the art have sought ways and means to control and/or predict molecular weight. It is recognized that selection of starting monomers, catalysts, and processing conditions may each affect the weight average molecular weight (Mw) of the polymers or copolymers being prepared. Catalyst choices may also be customized for other distinct or related reasons, such as overall reactivity profile.

For example, U.S. Pat. No. 6,869,904 B2 and U.S. Pat. No. 7,060,848 B2 mention catalysts including certain ligands, metals and arrays with substituted bridged bis-aromatic or bridged bis-biaromatic ligands.

PCT International Patent Application Publication Number WO 2007/136494 A2 mentions a catalyst composition comprising a zirconium complex of a polyvalent aryloxy ether and the use thereof in a continuous solution polymerization of ethylene, one or more $C_3$-$C_{30}$ olefins, and a conjugated or non-conjugated diene to prepare interpolymers having improved processing properties. The catalyst system contains a catalyst covalently bonded to an activator.

One particular group of catalysts is described in United States Patent Publication US20110282018 as effective to polymerize alpha-olefins and ethylene/alpha-olefins. These metal ligand complex catalysts are described as bis-phenylphoxy compounds that may or may not contain halogens in formula-determined locations which are, in some potential embodiments, ortho to a bridging moiety.

There remains a need in the art for convenient, efficient and controllable processes to tailor the rheological behavior of an olefinic product to a greater variety of specific end use applications.

In a first embodiment, the present invention is a process for preparing an olefin homopolymer or copolymer, comprising contacting ethylene, an alpha-olefin, or a combination thereof, and a catalytic amount of a metal-ligand complex catalyst of the formula

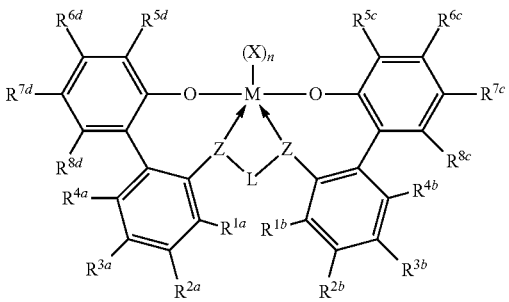

wherein M is titanium, zirconium, or hafnium, each independently being in a formal oxidation state of +2, +3, or +4; n is an integer of from 0 to 3, wherein when n is 0, X is absent; each X is independently a monodentate ligand that is neutral, monoanionic, or dianionic, or two X are taken together to form a bidentate ligand that is neutral, monoanionic, or dianionic; X and n are selected such that the metal-ligand complex is neutral; each Z moiety independently is O, S, N($C_1$-$C_{40}$) hydrocarbyl, or P($C_1$-$C_{40}$) hydrocarbyl; L is ($C_1$-$C_{40}$)hydrocarbylene or ($C_1$-$C_{40}$)heterohydrocarbylene, provided such has a portion that comprises a 2- to 8-carbon atom linker backbone linking the Z moieties, each atom of such 2- to 8-atom linker being independently a carbon atom or a heteroatom, wherein each heteroatom independently is O, S, S(O), S(O)$_2$, Si($R^C$)$_2$, Ge($R^C$)$_2$, P($R^P$), or N($R^N$); $R^{1a}$, $R^{1b}$, or both is a halogen atom; and $R^{2a}$, $R^{3a}$, $R^{4a}$, $R^{2b}$, $R^{3b}$, $R^{4b}$, $R^{6c}$, $R^{7c}$, $R^{8c}$, $R^{6d}$, $R^{7d}$, and $R^{8d}$ independently is a hydrogen atom; ($C_1$-$C_{40}$)hydrocarbyl; ($C_1$-$C_{40}$)heterohydrocarbyl; Si($R^C$)$_3$, Ge($R^C$)$_3$, P($R^P$)$_2$, N($R^N$)$_2$, OR$^C$, SR$^C$, NO$_2$, CN, F$_3$C, F$_3$CO, RCS(O)—, RCS(O)$_2$—, (RC)$_2$C=N—, RCC(O)O—, RCOC(O)—, RCC(O)N(R)—, (RC)2NC(O)— or halogen atom; each of $R^{5c}$ and $R^{5d}$ is independently a ($C_6$-$C_{40}$)aryl or ($C_1$-$C_{40}$) heteroaryl; and each of the aryl, heteroaryl, hydrocarbyl, heterohydrocarbyl, hydrocarbylene, and heterohydrocarbylene groups is independently unsubstituted or substituted with one or more substituents $R^S$; and each $R^S$ is independently a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl; under conditions such that an ethylene homopolymer, an alpha-olefin homopolymer, or an ethylene/alpha-olefin copolymer is formed, such having a weight average molecular weight that is reduced by at least 20 percent when compared with an otherwise identical ethylene homopolymer, alpha-olefin homopolymer or ethylene/alpha-olefin copolymer prepared under identical conditions with a catalyst that is otherwise identical but wherein neither $R^{1a}$ nor $R^{1b}$ is a halogen atom.

The inventive process surprisingly offers the advantage of greatly reducing molecular weight of a given ethylene or alpha-olefin homopolymer or ethylene/alpha-olefin copolymer without otherwise significantly modifying the nature of the homopolymerization or copolymerization. This molecular weight reduction, in turn, may offer a significant increase in flow behavior that correspondingly may increase the number and types of applications for use of these products.

The advantage is obtained by use as catalysts of a particular subset of the bis-phenylphenoxy compounds described in US20110282018. These are termed metal-ligand complex catalysts that combine a transition metal center and any of a wide variety of bis-phenylphenoxy-containing ligands conforming to formula (I), provided that the following limitations are met. First, the bridge, L, between the Z moieties is from 2 atoms to 8 atoms in length. Second, the Z moieties may be selected independently from oxygen, sulfur, phosphorus$(C_{1-40})$hydrocarbyl, and nitrogen $(C_{1-40})$hydrocarbyl. Third, the ligand has a halogen atom located in at least one of the positions on the benzene rings in the $R^{1a}$ and/or $R^{1b}$ position of formula (I), i.e., at a position, or positions, that is/are ortho to the bridged Z moieties. The term "halogen atom" means a fluorine atom radical (F), chlorine atom radical (Cl), bromine atom radical (Br), or iodine atom radical (I). Preferably each halogen atom independently is a Br, F, or Cl radical, and more preferably a F or Cl radical. Fourth, the metal M is preferably selected from zirconium (Zr), hafnium (Hf), and titanium (Ti), and more preferably is either Zr or Hf.

The members of the catalyst family defined as being useful for reduction of homopolymer or copolymer weight average molecular weight ($M_w$) are generally convenient to prepare and may operate efficiently and over a wide thermal operating range, in some non-limiting embodiments withstanding temperatures exceeding 200° C. Such catalysts may, themselves, be of effectively any $M_w$, but in certain non-limiting embodiments preferably range from 200 Daltons (Da) to 5,000 Da. Preparation may include, in non-limiting embodiments, construction of a suitable ligand structure followed by its reaction with a salt of the desired transition metal, which effects the desired metal-ligand complexation. Additional and highly detailed preparation information may be found in the examples included herein below, as well as in, e.g., the previously referenced US20110282018; US Serial Number PCT/US2012/0667700, filed Nov. 28, 2012, claiming priority to U.S. Provisional Application 61/581,418, filed Dec. 29, 2011; and U.S. Ser. No. 13/105,018, filed May 11, 2011, Publication Number 20110282018, claiming priority to US Provisional Application 61/487,627, filed Mar. 25, 2011. Those skilled in the art will recognize that similar and analogous processes may be used to prepare other useful bis-phenylphenoxy compounds falling within the given general definition.

Such suitable catalysts may generally include, in more specific but non-limiting embodiments, metal-ligand complexes of formula (I)

formula (I)

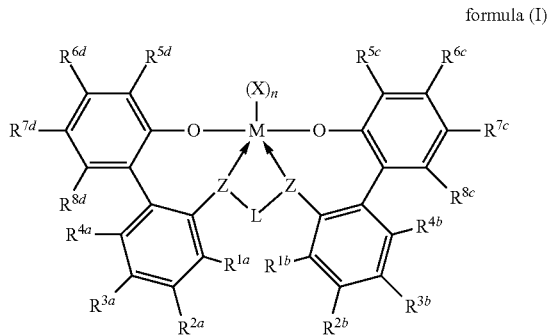

wherein M is titanium, zirconium, or hafnium, each independently being in a formal oxidation state of +2, +3, or +4; n is an integer of from 0 to 3, wherein when n is 0, X is absent; each X independently is a monodentate ligand that is neutral, monoanionic, or dianionic, or two X are taken together to form a bidentate ligand that is neutral, monoanionic, or dianionic; X and n are selected such that the metal-ligand complex is, overall, neutral; each Z is independently O, S, $N(C_1-C_{40})$hydrocarbyl, or $P(C_1-C_{40})$hydrocarbyl; L is $(C_1-C_{40})$hydrocarbylene or $(C_1-C_{40})$-heterohydrocarbylene, wherein the $(C_1-C_{40})$hydrocarbylene has a portion that comprises a 2- to 8-atom linker backbone linking the Z moieties and the $(C_1-C_{40})$heterohydrocarbylene has a portion that comprises a 2- to 8-atom linker backbone linking the Z moieties, wherein each atom of the 2- to 8-atom linker of the $(C_1-C_{40})$heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted $(C_1-C_{18})$hydrocarbyl or the two $R^C$ are taken together to form a $(C_2-C_{19})$alkylene, each $R^P$ is unsubstituted $(C_1-C_{18})$hydrocarbyl; and each $R^N$ is unsubstituted $(C_1-C_{18})$hydrocarbyl, a hydrogen atom or absent; $R^{1a}$, $R^{1b}$, or both is a halogen atom; and $R^{2a}$, $R^{3a}$, $R^{4a}$, $R^{2b}$, $R^{3b}$, $R^{4b}$, $R^{6c}$, $R^{7c}$, $R^{8c}$, $R^{6d}$, $R^{7d}$, and $R^{8d}$ independently is a hydrogen atom; $(C_1-C_{40})$hydrocarbyl; $(C_1-C_{40})$heterohydrocarbyl; Si($R^C$)$_3$, Ge($R^C$)$_3$, P($R^P$)$_2$, N($R^N$)$_2$, OR$^C$, SR$^C$, NO$_2$, CN, F$_3$C, F$_3$CO, RCS(O)—, RCS(O)$_2$—, (RC)$_2$C=N—, RCC(O)O—, RCOC(O)—, RCC(O)(R)—, (RC)2NC(O)— or halogen atom; each of $R^{5c}$ and $R^{5d}$ is independently a $(C_6-C_{40})$aryl or $(C_1-C_{40})$heteroaryl; and each of the aryl, heteroaryl, hydrocarbyl, heterohydrocarbyl, hydrocarbylene, and heterohydrocarbylene groups is independently unsubstituted or substituted with one or more substituents $R^S$; and each $R^S$ is independently a halogen atom, polyfluoro substitution, perfluoro substitution, unsubstituted $(C_1-C_{18})$alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted $(C_1-C_{18})$alkylene, wherein each R independently is an unsubstituted $(C_1-C_{18})$alkyl.

A wide variety of additional substitution may be present at all other carbons of the at least four phenyl rings included within the catalyst of formula (I) or such may have simply hydrogen. Some examples of preferred $R^{5c}$ and $R^{5d}$ substituents include 3,5-di(tertiary-butyl)phenyl; 3,5-diphenylphenyl; 1-naphthyl, 2-methyl-1-naphthyl; 2-naphthyl; 1,2,3,4-tetrahydronaphthyl; 1,2,3,4-tetrahydro-naphth-5-yl; 1,2,3,4-tetrahydronaphth-6-yl; 1,2,3,4-tetrahydroanthracenyl; 1,2,3,4-tetrahydroanthracen-9-yl; 1,2,3,4,5,6,7,8-octahydroanthracenyl; 1,2,3,4,5,6,7,8-octahydroanthracen-9-yl; phenanthren-9-yl; 1,2,3,4,5,6,7,8-octahydrophenanthren-9-yl; 2,3-dihydro-1H-inden-6-yl; naphthalene-2-yl; 1,2,3,4-tetrahydronaphthalen-6-yl; 1,2,3,4-tetrahydronaphthalen-5-yl; anthracen-9-yl; 1,2,3,4-tetrahydroanthracen-9-yl; 1,2,3,4,5,6,7,8-octahydro-anthracen-9-yl; 2,6-dimethylphenyl; 2,6-diethylphenyl; 2,6-bis(1-methylethyl)phenyl; 2,6-diphenylphenyl; 3,5-dimethylphenyl; 3,5-bis(tri-fluoromethyl) phenyl; 3,5-bis(1-methylethyl)phenyl; 3,5-bis(1,1-dimethylethyl)phenyl; 3,5-diphenyl-phenyl); 2,4,6-trimethylphenyl; and 2,4,6-tris(1-methylethyl)phenyl;

1-methyl-2,3-dihydro-1H-inden-6-yl; 1,1-dimethyl-2,3-dihydro-1H-inden-6-yl; 1-methyl-1,2,3,4-tetrahydro-naphthalen-5-yl; 1,1-dimethyl-1,2,3,4-tetrahydronaph-thalen-5-yl, 1,2,3,4-tetrahydroquinolinyl; isoquinolinyl; 1,2,3,4-tetrahydroisoquinolinyl; carbazolyl; 1,2,3,4-tetrahydrocarbazolyl; 1,2,3,4,5,6,7,8-octahydrocarbazolyl; 3,6-di(tertiary-butyl)-carbazolyl; 3,6-di(tertiary-octyl)-carbazolyl; 3,6-diphenyl-carbazolyl; 3,6-bis(2,4,6-trimethylphenyl)-carbazolyl; 3,6-di(tertiary-butyl)-carbazol-9-yl; 3,6-di(tertiary-octyl)-carbazol-9-yl; 3,6-diphenylcarbazol-9-yl; 3,6-bis(2,4,6-trimethylphenyl)-carbazol-9-yl; quin-olin-4-yl; quinolin-5-yl; quinolin-8-yl; 1,2,3,4-tetrahydroquinolin-1-yl; isoquinolin-1-yl; isoquinolin-4-yl; iso-quinolin-5-yl; isoquinolin-8-yl; 1,2,3,4-tetrahydroisoquinolin-2-yl; 1H-indol-1-yl; 1H-indolin-1-yl; 9H-carbazol-9-yl; 1,2,3,4-tetrahydrocarbazolyl-9-yl; 1,2,3,4,5,6,7,8-octahydrocarbazolyl-9-yl; 4,6-bis(1,1-dimethylethyl)pyri dine-2-yl; 4,6-diphenylpyridin-2-yl; 3-phenyl-1H-indol-1-yl; 3-(1,1-dimethylethyl)-1H-indol-1-yl; 3,6-diphenyl-9H-carbazol-9-yl; 3,6-bis[2',4',6'-tris(1,1-dimethylphenyl)]-9H-carbazol-9-yl; 3,6-bis(1,1-dimethyl-ethyl)-9H-carba-zol-9-yl.

In certain still more specific and preferred embodiments of the inventive process, the metal-ligand complex may be selected from compounds represented by any of the following formulas. Additional moieties denoted by abbreviations include Me (methyl); t-Bu (tert-butyl); OMe (methoxy); TMS (trimethylsilyl); Et (ethyl); and iPr (isopropyl).

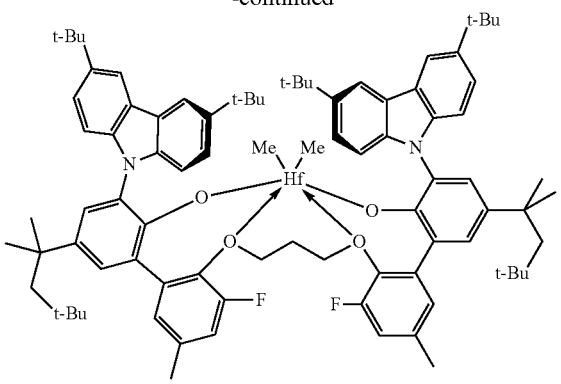

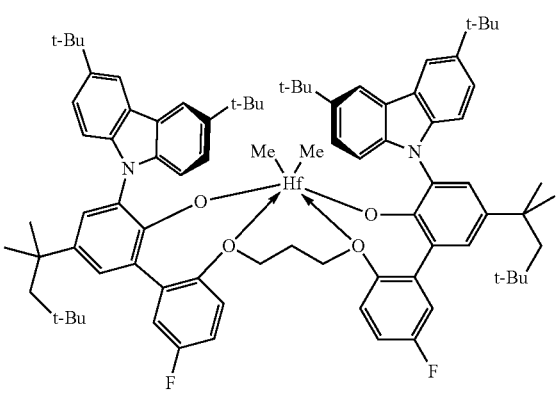

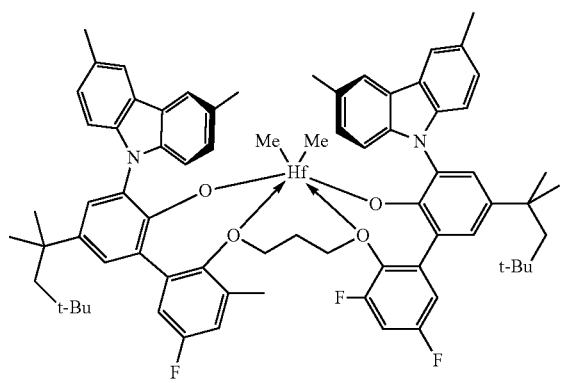

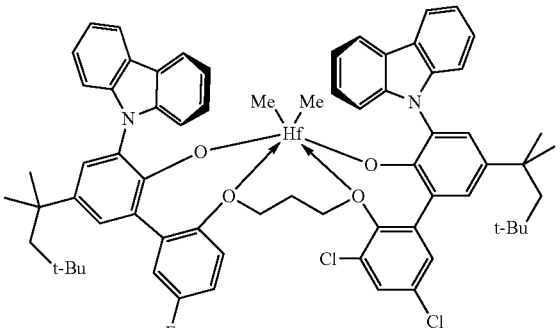

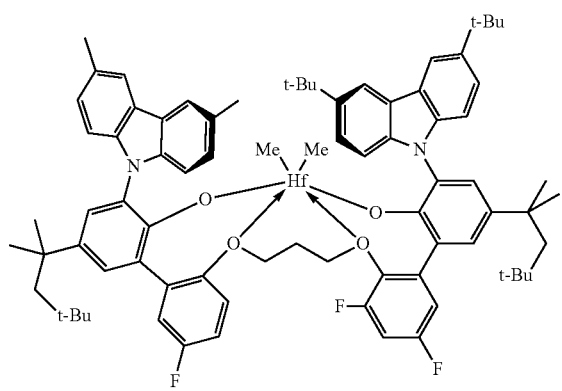

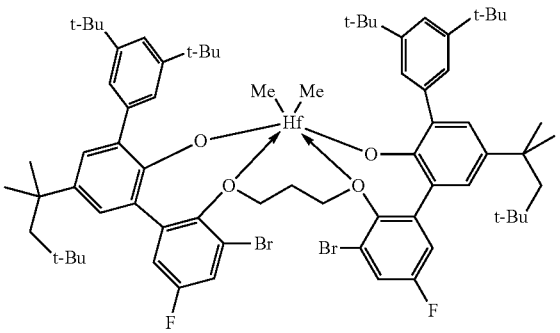

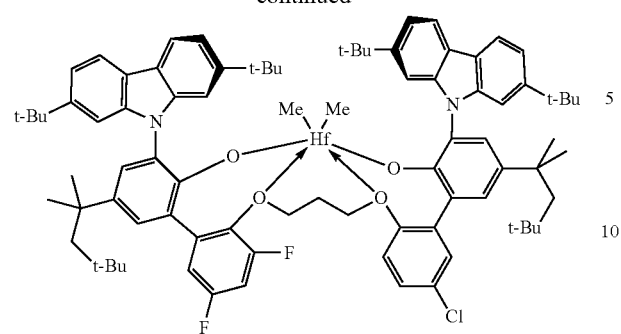
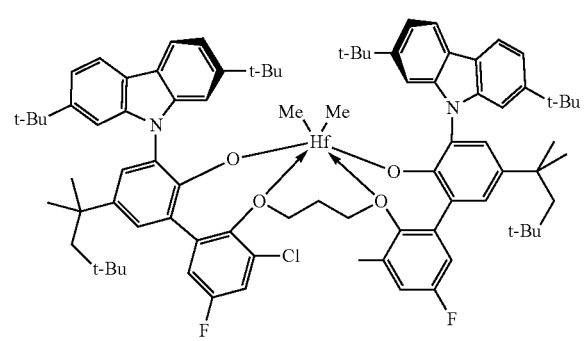
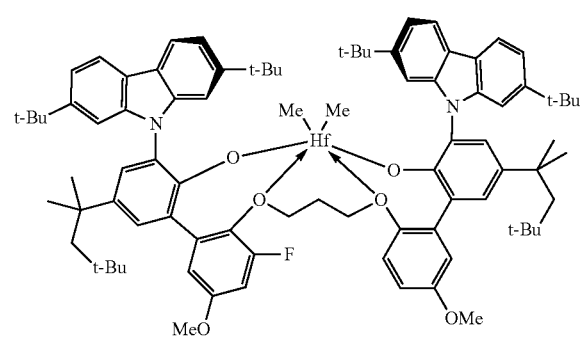
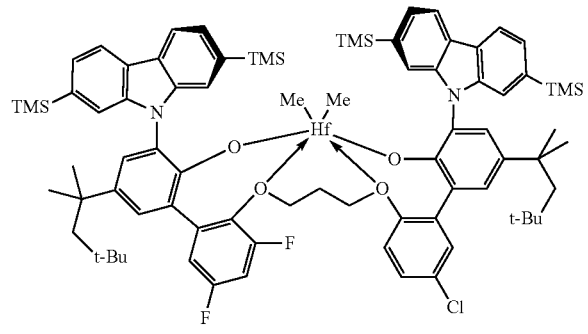
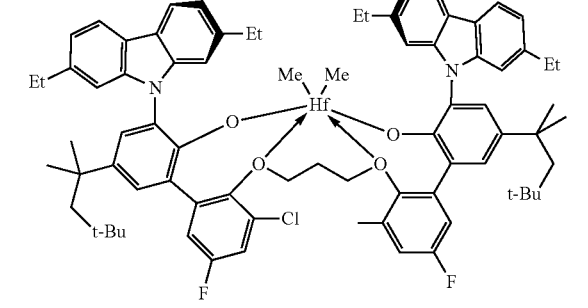
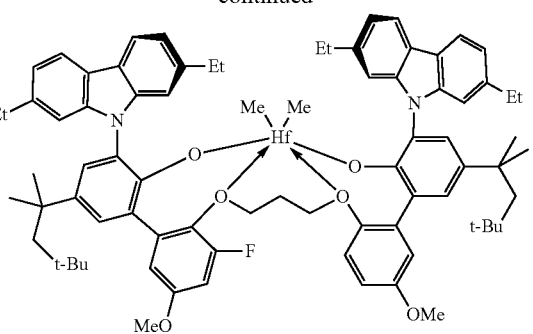
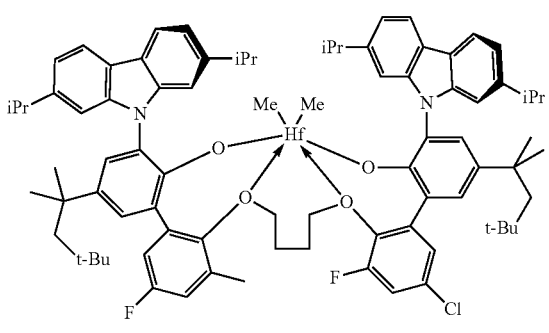
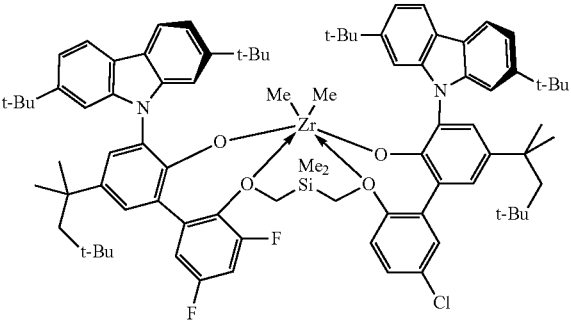
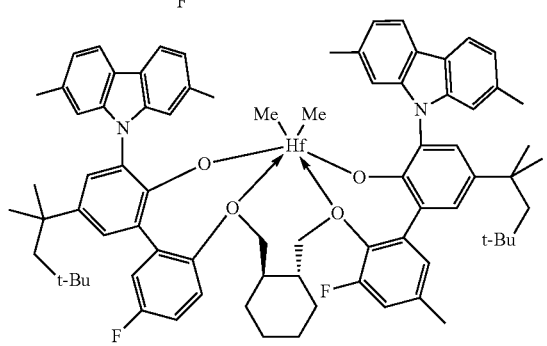
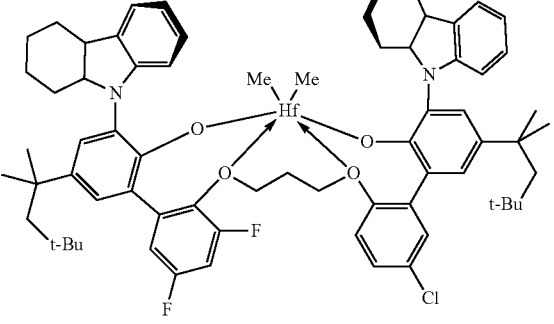

-continued

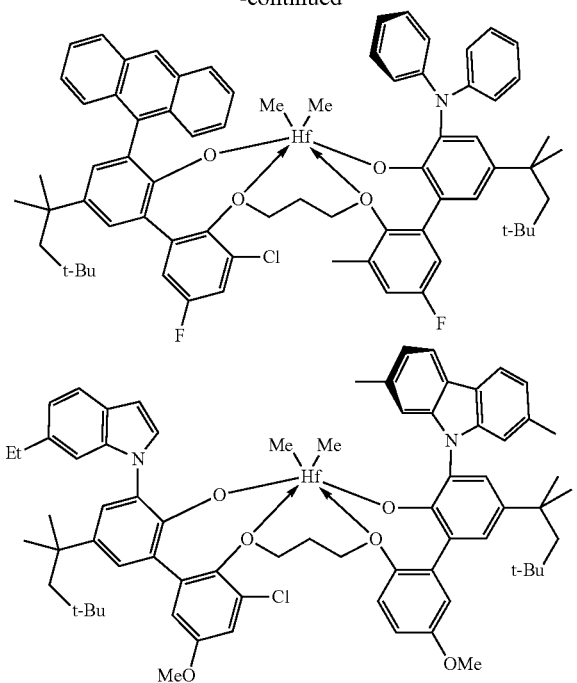

Once the catalyst is obtained, via purchase or preparation, it is ready for use in the inventive process. Where alpha-olefin homopolymerization or ethylene/alpha-olefin copolymerization is desirable, suitable alpha-olefins may be any selected according to the desired properties of the final copolymer. In non-limiting example only, the alpha-olefin may be selected from linear alpha-olefins having from 3 to 12 carbons, such as propylene, 1-butene, 1-pentene, 1-hexene, 1-heptene, 1-octene, 1-nonene, 1-decene, undecene, 1-dodecene, and combinations thereof. Smaller linear alpha-olefins having from 3 to 8 carbons are preferred, because they allow for a higher branch density of the final product oligomers. Branched alpha-olefins may also be employed in the process feed, and may include in non-limiting embodiments singly and multiply branched alpha-olefin monomers having from 5 to 16 carbons, wherein the first substituted carbon is at the "3" or greater position with respect to the vinyl, and combinations thereof. It is generally preferred that the first substitution be at the "4" or greater position.

In order to prepare the homopolymers or copolymers of the invention, ethylene and/or the selected alpha-olefin monomer(s) is/are fed into a suitable reactor, for batch, semi-continuous, or continuous production, wherein such monomer(s) will come into contact with the catalyst. In the case of preparation of a copolymer, it is noted that the ethylene/alpha-olefin reactivity ratio is distinct for any given catalyst and provides a methodology to determine the amount of alpha-olefin that will be required to attain a targeted copolymer composition. Reactivity ratios may be determined using well known theoretical techniques or empirically derived from actual polymerization data. Suitable theoretical techniques are disclosed, for example, in B. G. Kyle, *Chemical and Process Thermodynamics*, 3$^{rd}$ ed., Prentice-Hall (Englewood Cliffs, N.J. 1999) and in G. Soave, "Redlich-Kwong-Soave (RKS) Equation of State," *Chemical Engineering Science*, 1972, vol. 27, pp 1197-1203. Commercially available software programs may be used to assist in deriving reactivity ratios from experimentally derived data. One example of such software is Aspen Plus from Aspen Technology, Inc., Ten Canal Park, Cambridge, Mass. 02141-2201, USA. It is often preferred in many copolymer compositions that the amount of alpha-olefin included be less than the amount of ethylene, simply for reasons of relative cost of the monomers. Thus, it is often, although not always, preferred that the target amount of alpha-olefin in a copolymer range from 1 to 30 mole percent (mol %); more preferably from 1 to 25 mol %; and still more preferably from 0 to 20 mol %.

The metal-ligand complex of formula (I) is rendered catalytically active by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds, including but not limited to the use of such compounds under oxidizing conditions. A suitable activating technique may be bulk electrolysis. Combinations of one or more of the foregoing activating co-catalysts and/or techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Alumoxanes and their preparations are described in, for additional understanding, U.S. Pat. No. 6,103,657. Examples of preferred polymeric or oligomeric alumoxanes are methylalumoxane, triisobutylaluminum-modified methylalumoxane, and isobutylalumoxane. Such may be employed such that the ratio of total number of moles of the one or more metal-ligand complexes of formula (I) to total number of moles of activating co-catalyst is preferably from 1:10,000 to 100:1.

A variety of homopolymerization or copolymerization conditions and combinations thereof may be employed, according to the starting materials, nature of the reaction (batch, semi-continuous, or continuous), apparatus set-up, desired products, and so forth. However, in general, suitable polymers or copolymers of the invention may be produced using one or more of the specified catalyst selections at a temperature ranging from 20 degrees Celsius (° C.) to 220° C., and preferably 100° C. to 200° C., for a time preferably ranging from 10 minutes (min) to 300 min. Other parameters, such as pressure, may be controlled within ranges known to those skilled in the art and are not generally considered to be critical to practice of the present invention, but may be varied according to the desires and needs of the practitioner. It is usually preferred to carry out the process as a continuous process, using at least one continuous stir tank reactor (CSTR) or other suitable vessel(s).

The particular advantage of the invention will be apparent when comparative homopolymers or copolymers are prepared under identical conditions and using identical starting materials, where the inventive process uses one of the defined catalysts that has at least one halogen located in a position that is ortho to the Z moiety as defined, i.e., as the $R^{1a}$ and/or $R^{1b}$ substituent, and the comparative process uses a catalyst that is otherwise identical but which does not have a halogen at either of those locations. Surprisingly, it has been found that homopolymers or copolymers produced by the inventive process may have an $M_w$ that is reduced by at least 20%, preferably at least 30%, more preferably at least 40%, and most preferably at least 80%, when compared with the homopolymers or copolymers produced using the otherwise identical catalyst wherein neither $R^{1a}$ nor $R^{1b}$ is a halogen atom.

Even more surprisingly, it has been further found that homopolymers or copolymers produced by the inventive process using a catalyst wherein both of the $R^{1a}$ and $R^{1b}$ substituents are halogen atoms may have an $M_w$ that is reduced by at least 20%, preferably at least 30%, more preferably at least 40%, and most preferably at least 80%, when compared with homopolymers or copolymers produced by an otherwise identical inventive process employing a catalyst having just one halogen in either the $R^{1a}$ or the $R^{1b}$ position.

Thus, in certain embodiments, use of a catalyst including the one strategically located halogen in the ortho position may surprisingly produce a homopolymer or copolymer having a molecular weight that is as low as one-fifth that produced using an otherwise identical catalyst with no halogens at either ortho position, while use of a catalyst including two halogens in those ortho positions may surprisingly produce a homopolymer or copolymer having a molecular weight that is as low as one-tenth that produced using the otherwise identical catalyst with no halogens at either ortho position. In view of this, the inventive process enables a way to predictably reduce the weight average molecular weight ($M_w$) of the homopolymer or copolymer produced, which means that rheological behavior is modified and the processability and applications of the homopolymer or copolymer may also be modified in ways that may be desirable. At the same time, most other properties of the resulting homopolymer or copolymer are not comparably affected, although where an ethylene/alpha-olefin copolymer is being prepared, the amount of alpha-olefin incorporation may in some cases be somewhat reduced by the presence of a halogen atom at the $R^{1a}$, $R^{1b}$, or both positions.

EXAMPLES 1-6 AND COMPARATIVE EXAMPLES A-D

A series of catalysts having the chemical names and formula structures shown hereinbelow is used to carry out ethylene/1-octene copolymerizations.

Catalyst 1 is (2',2"-(propane-1,3-diylbis(oxy))bis(3-(3,6-di-tert-butyl-9H-carbazol-9-yl)-5'-fluoro-5-(2,4,4-trimethylpentan-2-yl)biphenyl-2-ol)dimethyl-hafnium. It is used for Comparative Example (CEx.) A.

Catalyst 2 is 2',2"-(propane-1,3-diylbis(oxy))-1-(3,6-di-tert-butyl-9H-carbazol-9-yl)-5'-fluoro-5-(2,4,4-trimethylpentan-2-yl)biphenyl-2-ol)-3-(3,6-di-tert-butyl-9H-carbazol-9-yl)-3',5'-difluoro-5-(2,4,4-trimethylpentan-2-yl) biphenyl-2-ol)dimethyl-hafnium. It is used for Example (Ex.) 1.

Catalyst 3 is (2',2"-(propane-1,3-diylbis(oxy))bis(3-(3,6-di-tert-butyl-9H-carbazol-9-yl)-3',5'-difluoro-5-(2,4,4-trimethylpentan-2-yl)biphenyl-2-ol)dimethyl-hafnium. It is used for Ex. 2.

Catalyst 4 is (2',2"-(propane-1,3-diylbis(oxy))bis(3-(2,7-di-tert-butyl-9H-carbazol-9-yl)-5'-fluoro-5-(2,4,4-trimethylpentan-2-yl)biphenyl-2-ol)dimethyl-hafnium. It is used for CEx. B.

Catalyst 5 is 2',2"-(propane-1,3-diylbis(oxy))-1-(2,7-di-tert-butyl-9H-carbazol-9-yl)-5'-fluoro-5-(2,4,4-trimethylpentan-2-yl)biphenyl-2-ol)-3-(2,7-di-tert-butyl-9H-carbazol-9-yl)-3',5'-difluoro-5-(2,4,4-trimethylpentan-2-yl) biphenyl-2-ol)dimethyl-hafnium. It is used for Ex, 3.

Catalyst 6 is 2',2"-(propane-1,3-diylbis(oxy))-1-(2,7-di-tert-butyl-9H-carbazol-9-yl)-5'-fluoro-5-(2,4,4-trimethylpentan-2-yl)biphenyl-2-ol)-3-(2,7-di-tert-butyl-9H-carbazol-9-yl)-3'-methyl-5'-fluoro-5-(2,4,4-trimethyl-pentan-2-yl)biphenyl-2-ol)dimethyl-hafnium. It is used for CEx. C.

Catalyst 7 is 2',2"-(propane-1,3-diylbis(oxy))-1-(2,7-di-tert-butyl-9H-carbazol-9-yl)-3'-5'-difluoro-5-(2,4,4-trimethylpentan-2-yl)biphenyl-2-ol)-3-(2,7-di-tert-butyl-9H-carbazol-9-yl)-3'-methyl-5'-fluoro-5-(2,4,4-trimethyl-pentan-2-yl)biphenyl-2-ol)dimethyl-hafnium. It is used for Ex. 4.

Catalyst 8 is (2',2"-(propane-1,3-diylbis(oxy))bis(3-(2,7-di-tert-butyl-9H-carbazol-9-yl)-3'-methyl-5'-fluoro-5-(2,4,4-trimethylpentan-2-yl)biphenyl-2-ol)dimethyl-zirconium. It is used for CEx. D.

Catalyst 9 is (2',2"-(propane-1,3-diylbis(oxy))bis(3-(2,7-di-tert-butyl-9H-carbazol-9-yl)-3'-5'-dichloro-5-(2,4,4-trimethylpentan-2-yl)biphenyl-2-ol)dimethyl-zirconium. It is used for Ex. 5.

Catalyst 10 is (2',2"-(propane-1,3-diylbis(oxy))bis(3-(2,7-di-tert-butyl-9H-carbazol-9-yl)-5'-difluoro-5-(2,4,4-trimethylpentan-2-yl)biphenyl-2-ol)dimethyl-zirconium. It is used for Ex. 6.

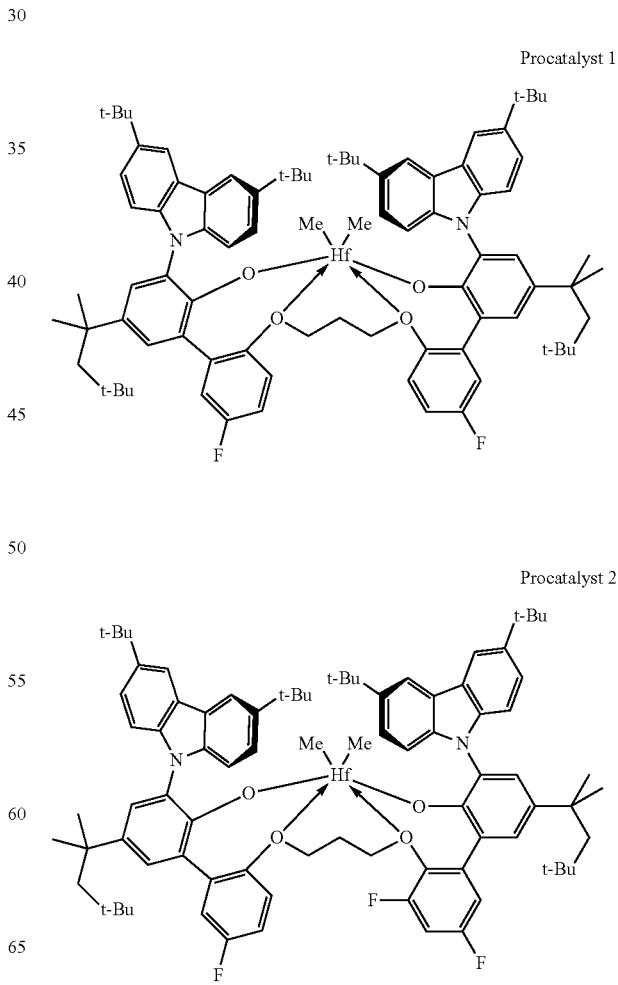

Procatalyst 1

Procatalyst 2

Procatalyst 3
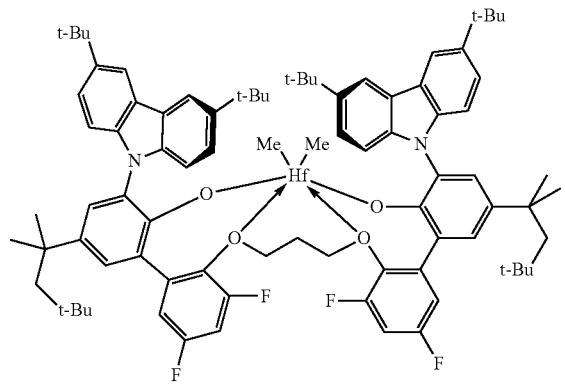
Procatalyst 4
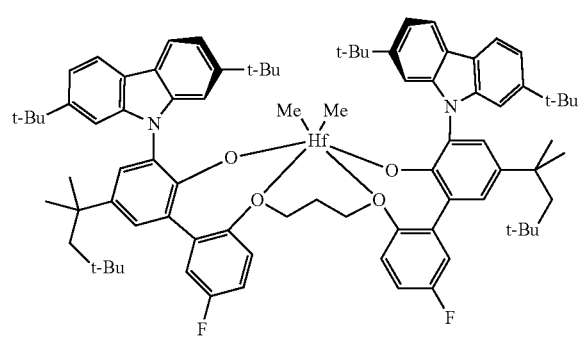
Procatalyst 5
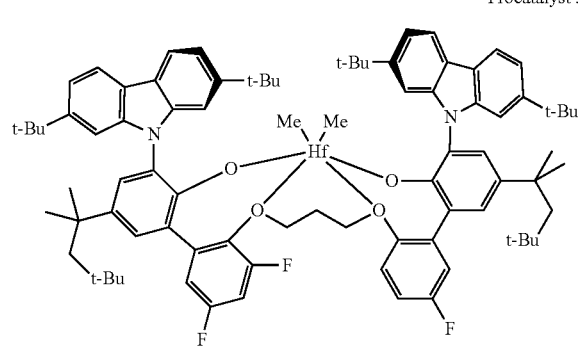
Procatalyst 6
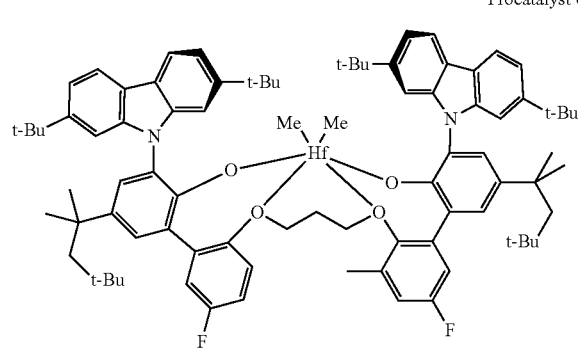
Procatalyst 7
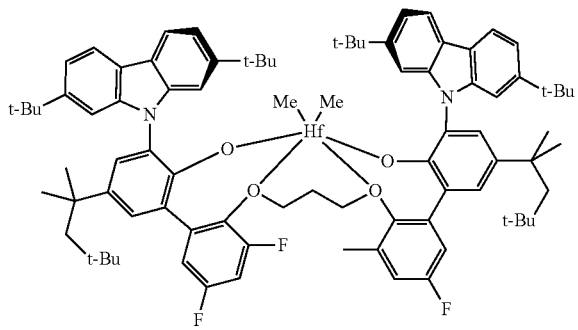
Procatalyst 8
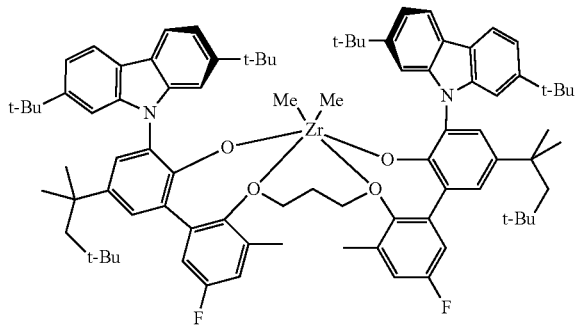
Procatalyst 9
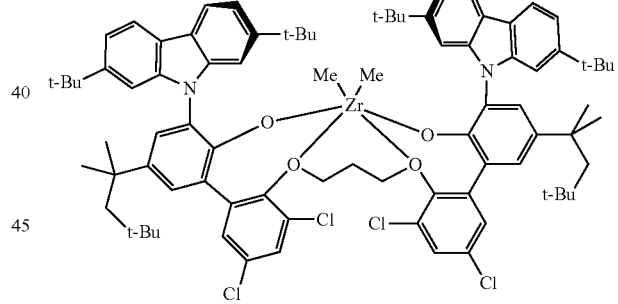
Procatalyst 10
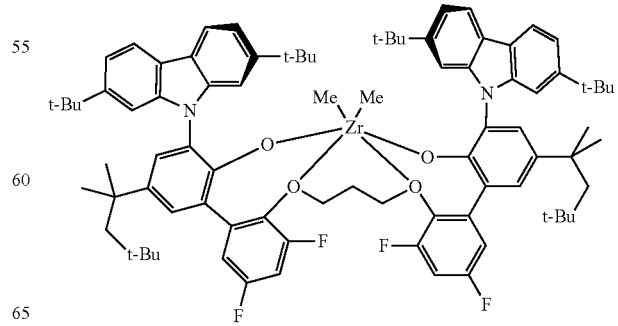

Each of the prepared catalysts is used to prepare an ethylene/octene copolymer by the following procedure. A 2 liter (L) Parr reactor is used in the polymerizations. All feeds are passed through columns of alumina and Q-5™ catalyst (available from Engelhard Chemicals Inc.) prior to introduction into the reactor. Catalyst and cocatalyst (activator) solutions are handled in the glove box. A stirred 2 L reactor is charged with about 605 grams (g) of mixed alkanes solvent and 300 g of 1-octene comonomer. The reactor contents are heated to the polymerization temperature of 140° C. and saturated with ethylene at 288 pounds per square inch gauge (psig, ~1.99 megapascals, MPa). Catalysts and cocatalysts, as dilute solutions in toluene, are mixed and transferred to a catalyst addition tank and injected into the reactor. The polymerization conditions are maintained for 10 minutes (min) with ethylene added on demand. Heat is continuously removed from the reaction vessel through an internal cooling coil. The resulting solution is removed from the reactor, quenched with isopropyl alcohol, and stabilized by addition of 10 milliliters (mL) of a toluene solution containing approximately 67 milligrams (mg) of a hindered phenol antioxidant (Irganox™ 1010 from Ciba Geigy Corporation) and 133 mg of a phosphorus stabilizer (Irgafos™ 168 from Ciba Geigy Corporation). Between polymerization runs, a wash cycle is conducted in which 850 g of mixed alkanes is added to the reactor and the reactor is heated to 150° C. The reactor is then emptied of the heated solvent immediately before beginning a new polymerization run. Polymers are recovered by drying for about 12 hours (h) in a temperature-ramped vacuum oven with a final set point of 140° C.

Polymer characterization is then carried out. Melting and crystallization temperatures of polymers are measured by differential scanning calorimetry (DSC 2910, TA Instruments, Inc.). Samples are first heated from room temperature to 180° C. at a ramp rate of 10° C./min. After being held at this temperature for 2 to 4 min, the samples are cooled to −40° C. at 10° C./min, held for 2 to 4 min, and then heated to 160° C. Molecular weight distribution (Mw, Mn) information is determined by analysis on a Robotic-Assisted Dilution High-Temperature Gel Permeation Chromatograph (RAD-GPC). Polymer samples are dissolved for 90 min at 160° C. at a concentration of 30 mg/mL in 1,2,4-trichlorobenzene (TCB) stabilized by 300 parts per million (ppm) of butylated hydroxytoluene (BHT) in capped vials while stirring. They are then diluted to 1 mg/mL immediately before a 400 microliter (μL) aliquot of the sample is injected. The GPC utilizes two (2) POLYMER LABS™ PLgel™ 10 μm MIXED-B columns (300 millimeter (mm)×10 mm) at a flow rate of 2.0 mL/min at 150° C. Sample detection is performed using a POLYMER CHAR™ IR4 detector in concentration mode. A conventional calibration of narrow Polystyrene (PS) standards is utilized, with apparent units adjusted to homo-polyethylene (PE) using known Mark-Houwink coefficients for PS and PE in 1,2,3-trichlorobenzene (TCB) at this temperature. Absolute Mw information is calculated using a polydispersity index (PDI) static low-angle light scatter detector. To determine octene incorporation, 140 μL of each polymer solution is deposited onto a silicon wafer, heated at 140° C. until the TCB has evaporated and analyzed using a Nicolet Nexus 670 Fourier transform infrared (FTIR) spectroscopy apparatus with 7.1 version software equipped with an AUTOPRO™ auto sampler. Results are shown in Table 1.

TABLE 1

Polymerization Results[a]

| Ex. or CEx. | Catalyst # | μmoles | Metal | Yield (g) | Efficiency (gPoly/gMetal) | Mw | Mw/Mn | Octene mol % |
|---|---|---|---|---|---|---|---|---|
| CEx. A | 1 | 0.055 | Hf | 35.3 | 3,595,822 | 554,019 | 2.17 | 29.9 |
| Ex. 1 | 2 | 0.08 | Hf | 22.3 | 1,561,712 | 105,743 | 2.30 | 13.7 |
| Ex. 2 | 3 | 0.15 | Hf | 50.7 | 1,893,664 | 25,607 | 2.52 | 8.7 |
| CEx. B | 4 | 0.055 | Hf | 12 | 1,222,376 | 209,430 | 2.11 | 18.4 |
| Ex. 3 | 5 | 0.02 | Hf | 16.2 | 4,538,069 | 148,247 | 2.44 | 5.8 |
| Cex. C | 6 | 0.03 | Hf | 17.7 | 3,305,507 | 692,532 | 2.69 | 4.0 |
| Ex. 4 | 7 | 0.02 | Hf | 11.9 | 3,333,520 | 339,431 | 2.19 | 1.2 |
| Cex. D | 8 | 0.01 | Zr | 28.7 | 31,461,019 | 198,051 | 2.90 | 0.0 |
| Ex. 5 | 9 | 0.02 | Zr | 28.8 | 15,785,320 | 42,020 | 3.22 | 2.2 |
| Ex. 6 | 10 | 0.06 | Zr | 40.7 | 7,435,909 | 21,870 | 3.18 | 4.2 |

[a]Polymerization conditions: 2 L batch reactor, 605 mL of Isopar ™-E; temp = 140° C.; 300 g of 1-octene; ethylene pressure = 288 psi; catalyst:activator = 1:1.2; activator; [HNMe(C$_{18}$H$_{37}$)$_2$][B(C$_6$F$_5$)$_4$]; 1:10 MMAO; reaction time 10 min.

It is noted that reduction of the molecular weight via use of the single- (Catalyst 2, 5, and 7) or double-halogenated (Catalyst 3, 9, and 10) [at the ortho position(s)] catalysts also proportionately reduces octene incorporation into the copolymer when compared with copolymers prepared using non-halogenated [at the ortho position(s)] catalysts (Catalyst 1, 4, 6, and 8). Furthermore, halogenation with fluorine atoms appears to be more effective in these examples than halogenation with chlorine atoms.

EXAMPLE 7

This Ex. 7 illustrates a sample catalyst preparation. Those skilled in the art will understand that similar and analogous methods may be carried out to prepare other catalysts suitable for use in the present invention. Confirmation of each product is carried out by $^1$H NMR and $^{19}$F NMR.

(a) Step 1: Preparation of 2-(3-bromopropoxy)-1,5-difluoro-3-iodobenzene

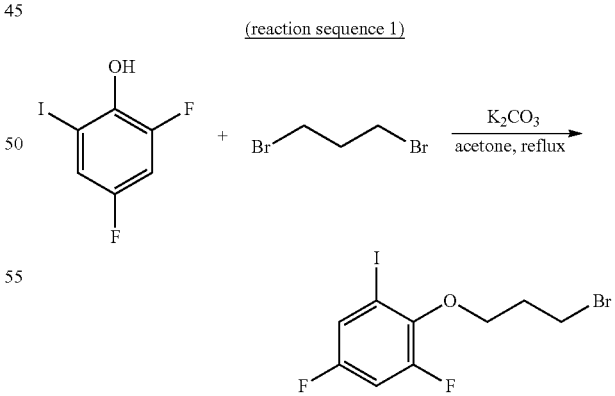

A mixture of 2-iodo-4,6-difluorophenol (10.00 g, 38.28 millimoles (mmol)) [prepared according to WO/2012/027448], 1,3-dibromopropane (155 g, 765 mmol), potassium carbonate (10.582 g, 76.566 mmol), and acetone (250 mL) is heated to reflux for 1 h. The mixture is allowed to cool to room temperature and concentrated. The residue is partitioned in a 50/50 methylene chloride/water mixture and extracted with methylene chloride. The combined organic phases are washed with 2 N NaOH (300 mL), brine (300 mL), water (300 mL), dried over MgSO$_4$, filtered through a pad of silica gel and concentrated. The resulting oil is purified via column chromatography using a hexanes:ethyl acetate gradient to afford 12.5 g (86.8%) of the product as a slightly yellow oil. As used herein, "hexanes" refers to a commercially obtained mixture of hexane isomers.

(b) Step 2: Preparation of 1,5-difluoro-2-(3-(4-fluoro-2-iodophenoxy)propoxy)-3-iodobenzene (reaction sequence 2)

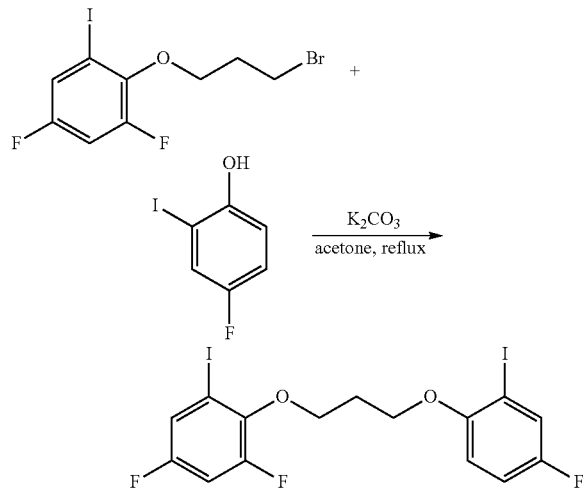

A mixture of 2-(3-bromopropoxy)-1,5-difluoro-3-iodobenzene (4.00 g, 10.6 mmol), 2-iodo-4-fluorophenol (2.525 g, 10.61 mmol) [prepared according to WO/2012/027448], potassium carbonate (3.094 g, 22.39 mmol), and acetone (80 mL) is heated to reflux and allowed to stir overnight. The mixture is cooled to room temperature and filtered. The cake is washed with acetone. The filtrate is concentrated to afford the crude as dark brown oil which is purified by column chromatography using 5% ethyl acetate in hexanes to afford 3.69 g (65.1%) of the product as a colorless oil.

(c) Step 3: Preparation of 3-(3,6-di-tert-butyl-9H-carbazol-9-yl)-2'-(3-((3'-(3,6-di-tert-butyl-9H-carbazol-9-yl)-5-fluoro-2'-hydroxy-5'-(2,4,4-trimethylpentan-2-yl)-[1,1'-biphenyl]-2-yl)oxy)propoxy)-3',5'-difluoro-5-(2,4,4-trimethylpentan-2-yl)-[1,1'-biphenyl]-2-ol (reaction sequence 3)

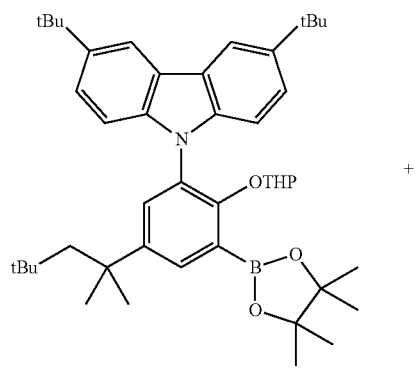

+

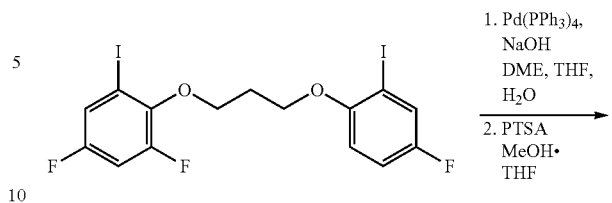

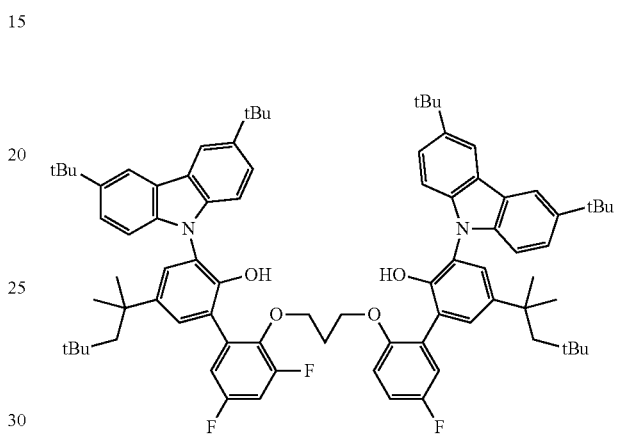

A mixture of 1,2-dimethoxyethane (69 mL), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carba-zole (4.00 g, 5.71 mmol) [prepared according to US2011/0282018], 1,5-difluoro-2-(3-(4-fluoro-2-iodophenoxy)propoxy)-3-iodobenzene (1.524 g, 2.711 mmol), a solution of NaOH (0.6849 g, 17.12 mmol) in water (16 mL) and tetrahydrofuran (THF) (40 mL) is purged with nitrogen (N$_2$) for 15 min, then Pd(PPh$_3$)$_4$ ((Ph=phenyl, 0.1318 g, 0.1142 mmol) is added and heated to 85° C. overnight. The mixture is allowed to cool to room temperature and concentrated. The residue is taken up in methylene chloride (200 mL), washed with brine (200 mL), dried over anhydrous MgSO$_4$, filtered through a pad of silica gel, and concentrated to afford the crude protected ligand. To the crude is added THF (50 mL), methanol (MeOH, 50 mL) and approximately 100 mg of p-toluenesulfonic acid monohydrate (PTSA). The solution is heated to 60° C. overnight, then cooled and concentrated. To the crude ligand is added methylene chloride (200 mL), washed with brine (200 mL), dried over anhydrous MgSO$_4$, filtered through a pad of silica gel, and concentrated to afford a brown crystalline powder. The solid is purified by column chromatography using a gradient of methylene chloride:hexanes to afford 1.77 g (52.4%) of the product as a white solid.

(d) Step 4: Formation of Metal-Ligand Complex

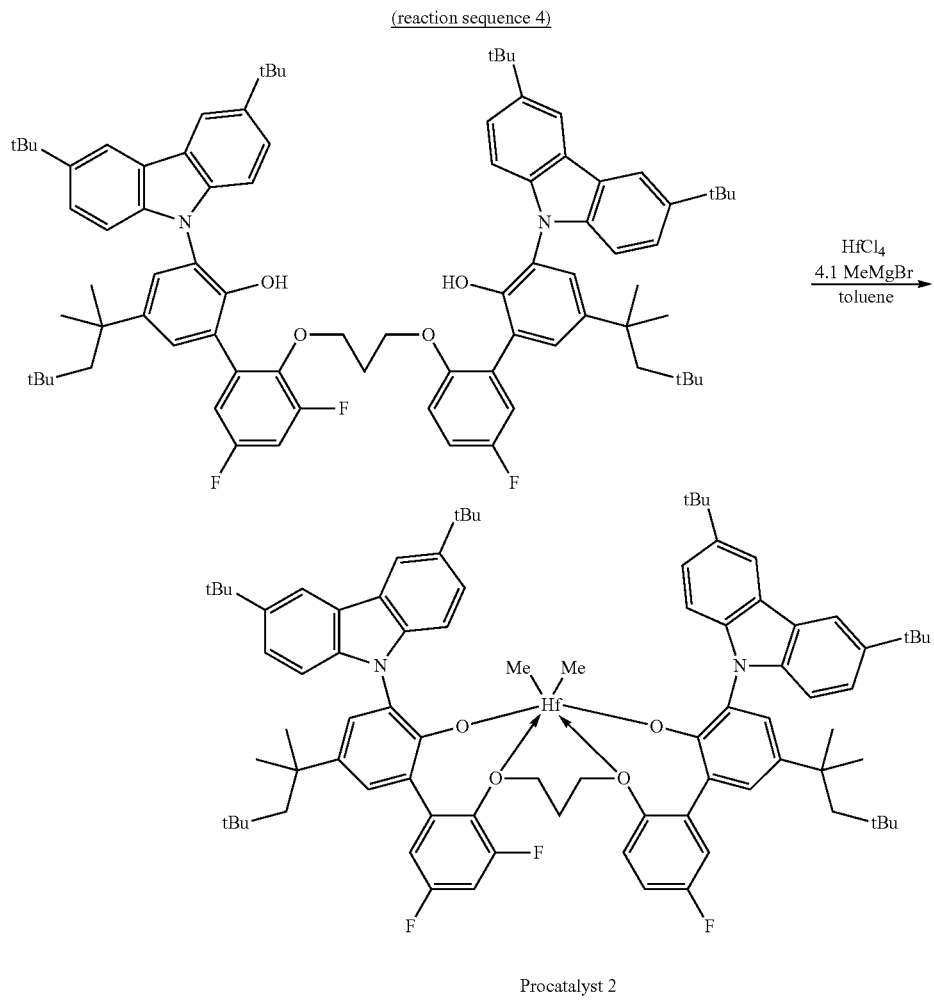

Procatalyst 2

To a mixture of HfCl$_4$ (0.117 g, 0.37 mmol) and ligand (0.4573 g, 0.37 mmol) suspended in toluene (4 mL) is added 3M MeMgBr (Me=methyl, 0.52 mL, 1.56 mmol) in diethyl ether. After stirring for 1 hr at room temperature, hexane (10 mL) is added and the suspension is filtered, giving colorless solution. Solvent is removed under reduced pressure to give 0.4125 g (77.4%) of product metal-ligand complex.

EXAMPLE 8

Catalyst 4 is prepared as follows:

(a) Step 1: Preparation of 2,7-di-tert-butyl-9-(2-((tetrahydro-2H-pyran-2-yl)oxy)-5-(2,4,4-trimethyl-pentan-2-yl)phenyl)-9H-carbazole (reaction sequence 5)

A mixture of 2-(2-iodo-4-(2,4,4-trimethylpentan-2-yl)phenoxy)tetrahydro-2H-pyran (21.74 g, 52.22 mmol) [prepared according to WO/2012/027448], 2,7-di-tert-butylcarbazole (8.03 g, 28.73 mmol) [prepared according to (need full citation here) *Synthesis* 1979, 49-50], K$_3$PO$_4$ (23.40 g, 110.24 mmol), anhydrous CuI (0.22 g, 1.16 mmol), dry toluene (85 mL) and N,N'-dimethylethylenediamine (0.45 mL, 4.18 mmol) is heated to 125° C. After 24 h, additional anhydrous CuI (0.2 g, 1.05 mmol) slurry in dry toluene (0.9 mL) and N,N'-dimethylethylenediamine (0.45 mL, 4.18 mmol) is added and stirring is continued at 125° C. for an additional 72 h. After 96 h, the reaction is allowed to cool to room temperature and filtered through a small silica plug, washed with THF and concentrated to give the crude product as a dark brown oil. The crude is crystallized from hot hexanes (50 mL) to afford 13.48 g (90.9%) of the product as an off-white powder.

(b) Step 2: Preparation of 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole A solution of 2,7-di-tert-butyl-9-(2-((tetrahydro-2H-pyran-2-yl)oxy)-5-(2,4,4-trimethylpentan-2-yl)-phenyl)-9H-carbazole (7.70 g, 13.56 mmol) and dry THF (90 mL) under N$_2$ atmosphere is cooled to 0-10° C. (ice-water bath) and 2.5 molar (M) n-BuLi (Bu=butyl) in hexanes (14.0 mL, 35.0 mmol) is added slowly. After 4 hr, 2-iso-propoxy-4,4,5,5-tetramethyl-1,3,2-dioxaborolane (7.0 mL, 34.3 mmol) is added slowly. The mixture is stirred for 1 h at 0-10° C. before allowing the reaction to warm to room temperature and then stirred for an additional 18 h. To the reaction mixture is added cold saturated aqueous sodium bicarbonate (75 mL) and then the mixture is extracted with four 50-mL portions of methylene chloride. The combined organic phases are washed with cold saturated aqueous sodium bicarbonate (200 mL), brine (200 mL), dried over anhydrous MgSO$_4$, filtered and concentrated to give the crude as a golden foam. This crude is slurried in acetonitrile (75 mL) and allowed to sit for 1 h at room temperature. The solid is isolated, washed with a small portion of cold acetonitrile and dried under high vacuum to afford 8.12 g (86.3%) of the product as a white powder.

(c) Step 3: Preparation of 6',6'''-(propane-1,3-diylbis(oxy))bis(3-(2,7-di-tert-butyl-9H-carbazol-9-yl)-3'-fluoro-5-(2,4,4-trimethylpentan-2-yl)-[1,1'-biphenyl]-2-ol)

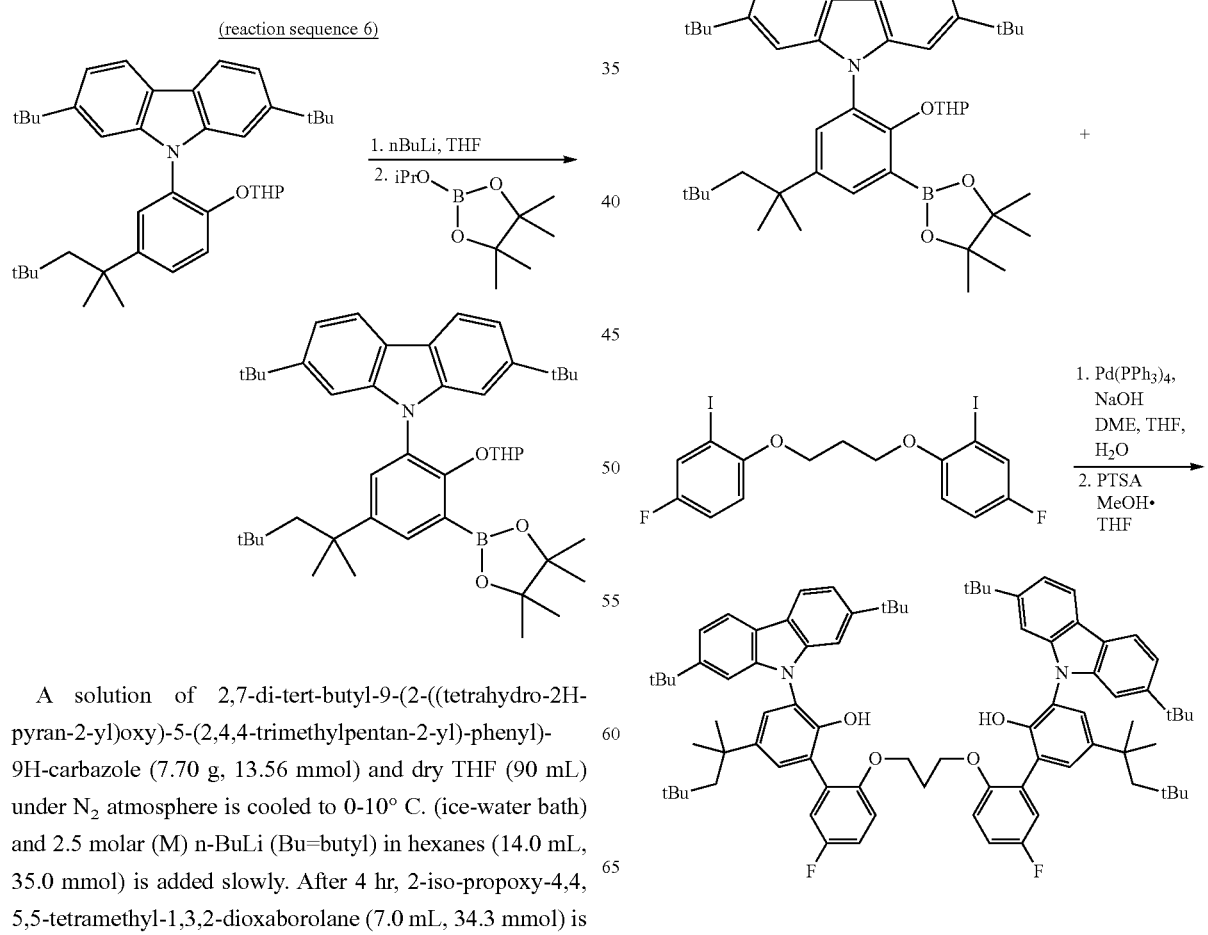

A mixture of 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (4.00 g, 5.24 mmol adjusted based on a purity of 90.9% by high performance liquid chromatography, HPLC), 1,2-dimethoxyethane (65 mL), a solution of NaOH (0.67 g, 17.25 mmol) in water (19 mL), THF (22 mL), and 1,3-bis(4-fluoro-2-iodophenoxy)propane (1.28 g, 2.49 mmol) [prepared according to WO/2012/027448] is purged with $N_2$ for approximately 15 min. Then, Pd(PPh$_3$)$_4$ (202 mg, 0.18 mmol) is added and heated to reflux. After 48 h, the mixture is allowed to cool to room temperature. The precipitate is isolated and dried under high vacuum for about 1 h to afford the crude protected ligand. The crude is dissolved in a mixture of THF (100 mL) and MeOH (100 mL) and then heated to 60° C. To the solution is added PTSA until the solution becomes acidic (measured via pH paper), then it is stirred at 60° C. for 8 h and then allowed to cool. The precipitate is isolated by vacuum filtration, rinsed with cold acetonitrile (25 mL) and dried to afford about 1 g of ligand. Meanwhile, the filtrate develops a precipitate which is isolated and dried under high vacuum to afford approximately 1 additional g of ligand. The crops are combined using chloroform (50 mL) and concentrated to afford 2.37 g (77.6%) of ligand as white powder.

(d) Step 4: Formation of Metal-Ligand Complex (reaction sequence 8)

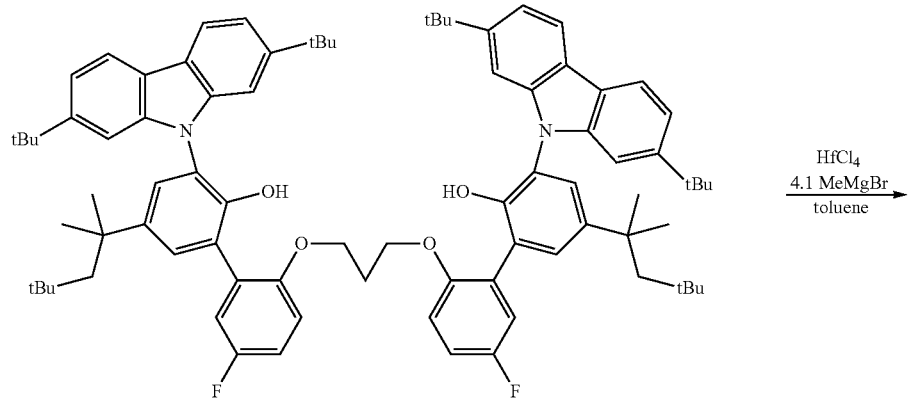

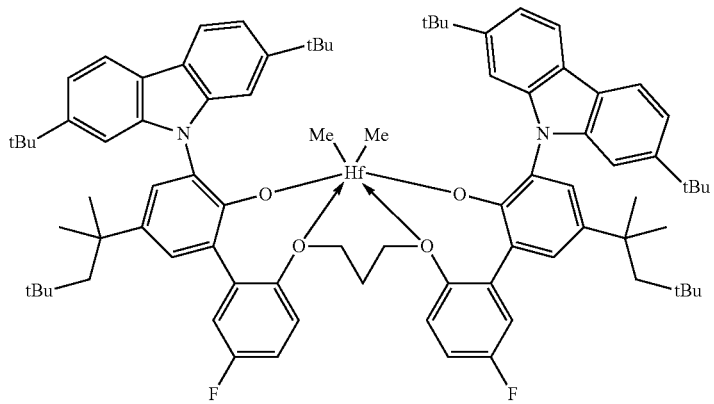

Procatalyst 4

To a cold (−30° C.) toluene solution (40 mL) of ligand (0.545 g, 0.44 mmol) and HfCl$_4$ (0.142 g, 0.44 mmol) is added 3 M MeMgBr in diethyl ether (0.64 mL, 1.92 mmol). After stirring for 2 h, the black suspension is filtered using medium glass frit giving colorless solution. Solvent is removed under reduced pressure giving 0.589 g (92.5%) of product.

EXAMPLE 9

(a) Step 1: Preparation of 3-(2,7-di-tert-butyl-9H-carbazol-9-yl)-2'-(3-((3'-(2,7-di-tert-butyl-9H-carbazol-9-yl)-5-fluoro-2'-hydroxy-5'-(2,4,4-trimethylpentan-2-yl)-[1,1'-biphenyl]-2-yl)oxy)propoxy)-3',5'-difluoro-5-(2,4,4-trimethylpentan-2-yl)-[1,1'-biphenyl]-2-ol

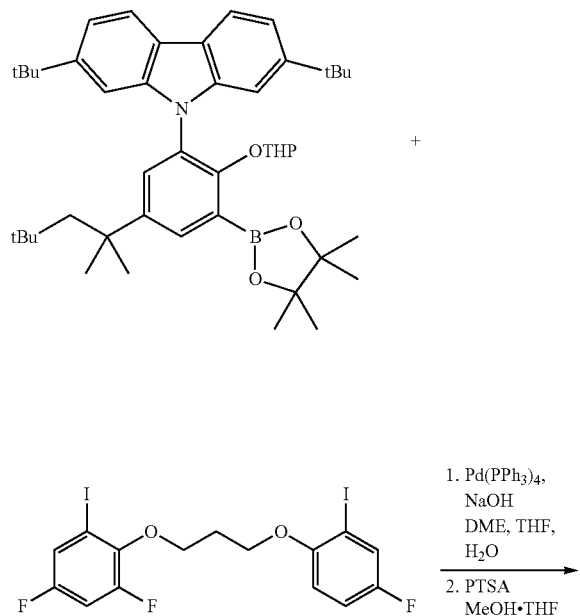

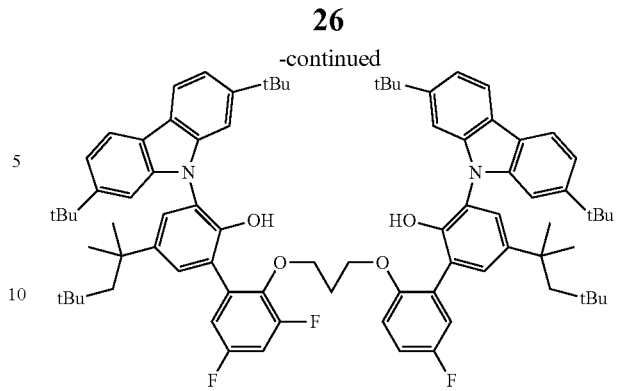

A mixture of 1,2-dimethoxyethane (69 mL), 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (4.00 g, 5.708 mmol), 1,5-difluoro-2-(3-(4-fluoro-2-iodophenoxy)propoxy)-3-iodobenzene (1.524 g, 2.711 mmol), a solution of NaOH (0.6849 g, 17.12 mmol) in water (16 mL) and THF (40 mL) is purged with N$_2$ for 15 min, then Pd(PPh$_3$)$_4$ (0.1318 g, 0.1142 mmol) is added and heated to 85° C. overnight, then cooled. To the residue is added methylene chloride (200 mL), then it is washed with brine (200 mL), dried over anhydrous MgSO$_4$, filtered through a pad of silica gel, and concentrated to afford the crude protected ligand. To the crude is added THF (50 mL), MeOH (50 mL) and approximately 100 mg of PTSA, added until acidic solution by pH paper. The solution is heated to 60° C. overnight, then cooled and concentrated. To the crude mixture is added methylene chloride (200 mL), it is washed with brine (200 mL), dried over anhydrous MgSO$_4$, filtered through a pad of silica gel, and concentrated to afford a brown crystalline powder. The crude is purified via column chromatography, eluting with a methylene chloride:hexanes gradient to afford 2.63 g (81.2%) of the ligand as a white solid.

(b) Step 2: Formation of Metal-Ligand Complex

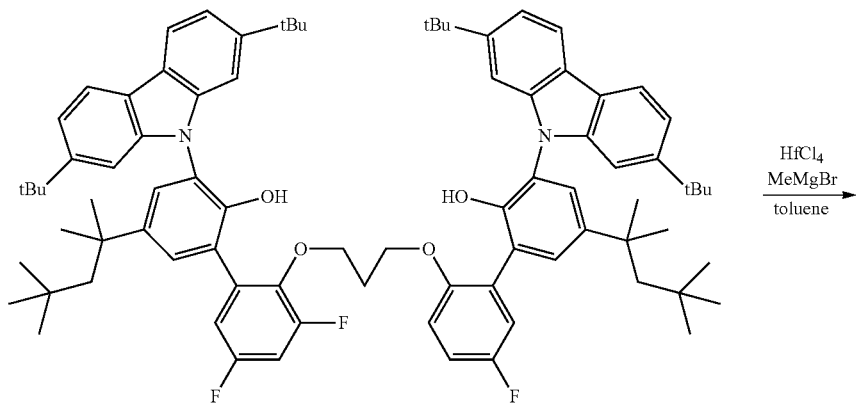

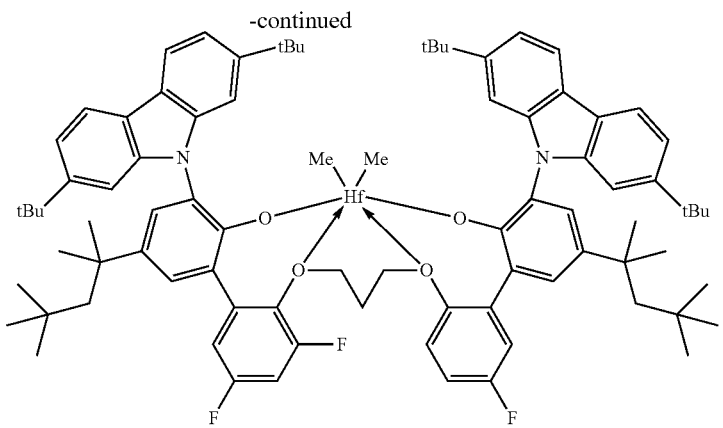

Procatalyst 5

To a cold (−25° C.) slurry of HfCl₄ (0.1038 g, 0.3241 mmol) in toluene (20 mL) is added 3.0 M MeMgBr in diethyl ether (0.45 mL, 1.35 mmol) and agitated vigorously for 2 min. To the mixture is added the ligand (0.4022 g, 0.3229 mmol) as a solid using toluene (3.0 mL) to rinse. The brown mixture is stirred for 2 h at room temperature, then hexanes (20 mL) is added and the mixture is filtered. The filtrate, a colorless solution, is concentrated under high vacuum. To the solid is added hexanes (10 mL) and stirred for about 10 min. The off-white solid is collected by filtration and dried under high vacuum to afford 0.4112 g (87.7%) of the product.

EXAMPLE 10

(a) Step 1: Preparation of 1-(3-bromopropoxy)-4-fluoro-2-iodobenzene

A mixture of 4-fluoro-2-iodophenol (7.0020 g, 29.420 mmol), potassium carbonate (8.2954 g, 60.020 mmol), 1,3-dibromopropane (59.00 mL, 581.262 mmol), and acetone (200 mL) is stirred and refluxed overnight. After 16.5 h, the reaction is allowed to cool to room temperature and filtered by vacuum filtration. The solids are washed with acetone (2×20 mL) and filtered as well. The filtrate is concentrated and the yellow solution that remains is distilled under vacuum to remove the remaining 1,3-dibromopropane. The crude brown oil is dissolved in a small amount of hexanes and is purified by column chromatography using a gradient of 0-5% ethyl acetate in hexanes to afford 8.99 g (85.1%) of the product as a yellow oil.

(b) Step 2: Preparation of 5-fluoro-2-(3-(4-fluoro-2-iodophenoxy)propoxy)-1-iodo-3-methylbenzene

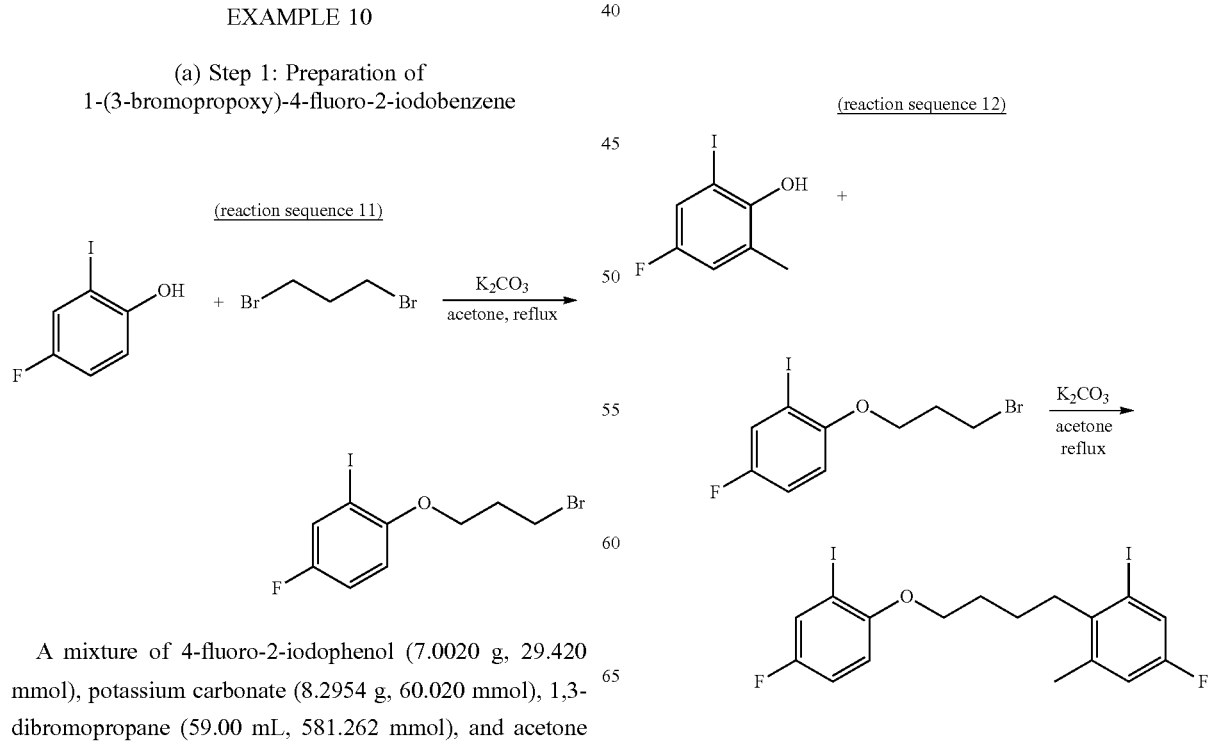

A mixture of 1-(3-bromopropoxy)-4-fluoro-2-iodobenzene (8.9856 g, 25.032 mmol), 4-fluoro-2-iodo-6-methylphenol (6.3096 g, 25.036 mmol), potassium carbonate (7.400 g, 53.542 mmol), and acetone (165 mL) is stirred and refluxed overnight. After 16 h, the reaction is allowed to cool to room temperature and filtered by vacuum filtration. The solids are washed with acetone (2×20 mL) and filtered as well. The filtrate is concentrated to afford the crude product as dark brown oil. The oil is dissolved in a small amount of hexanes and is purified by column chromatography using a gradient of 0-5% ethyl acetate in hexanes to afford 11.55 g (87.1%) of the product as a yellow solid.

(c) Step 3: Preparation of 3-(2,7-di-tert-butyl-9H-carbazol-9-yl)-2'-(3-((3'-(2,7-di-tert-butyl-9H-carbazol-9-yl)-5-fluoro-2'-hydroxy-5'-(2,4,4-trimethylpentan-2-yl)-[1,1'-biphenyl]-2-yl)oxy)propoxy)-5'-fluoro-3'-methyl-5-(2,4,4-trimethylpentan-2-yl)-[1,1'-biphenyl]-2-ol (reaction sequence 14)

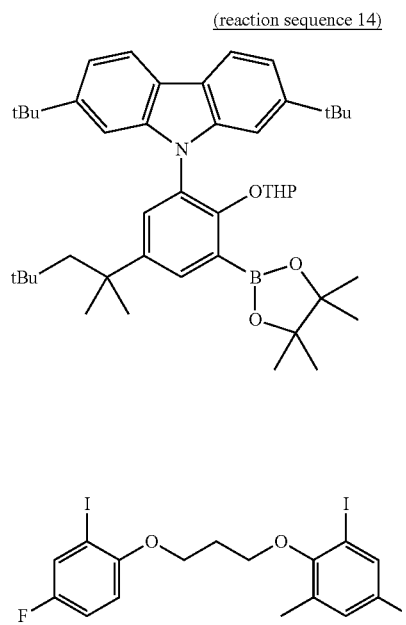

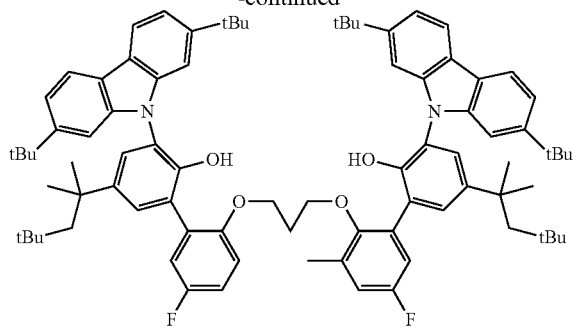

A mixture of 2,7-di-tert-butyl-9-(2-(((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (9.4182 g, 13.575 mmol), 1,2-DME (170 mL), a solution of NaOH (1.8145 g, 45.438 mmol) in water (49 mL), THF (57 mL), and 5-fluoro-2-(3-(4-fluoro-2-iodophenoxy)propoxy)-1-iodo-3-methylbenzene (3.4233 g, 6.458 mmol) is stirred and purged with $N_2$ for approximately 15 min, then $Pd(PPh_3)_4$ (0.5432 g, 0.470 mmol) is added. The mixture is heated to reflux for 19 h and allowed to cool to room temperature. The phases are separated and the organic phase is dried over anhydrous $MgSO_4$, filtered, and concentrated to afford a foamy golden orange solid as a crude protected ligand. The crude is dissolved in a mixture of THF (250 mL) and MeOH (250 mL), then heated to 60° C. To the solution is added PTSA (3.0380 g, 15.971 mmol) until the solution becomes acidic. The reaction is stirred at 60° C. overnight, then allowed to cool to room temperature, and concentrated to afford a brown sticky solid. The crude product is dissolved in chloroform and silica gel is added. The slurry is concentrated to afford a dry powdery mixture which is purified by flash column chromatography using a gradient of 2-5% ethyl acetate in hexanes to afford the product as a light yellow crystalline solid. To remove traces of ethyl acetate, the solid is dissolved in dichloromethane and concentrated to afford a light yellow crystalline solid (repeated twice). The solid is dried under high vacuum to afford 6.17 g (77.0%).

(d) Step 3: Formation of Metal-Ligand Complex (reaction sequence 15)

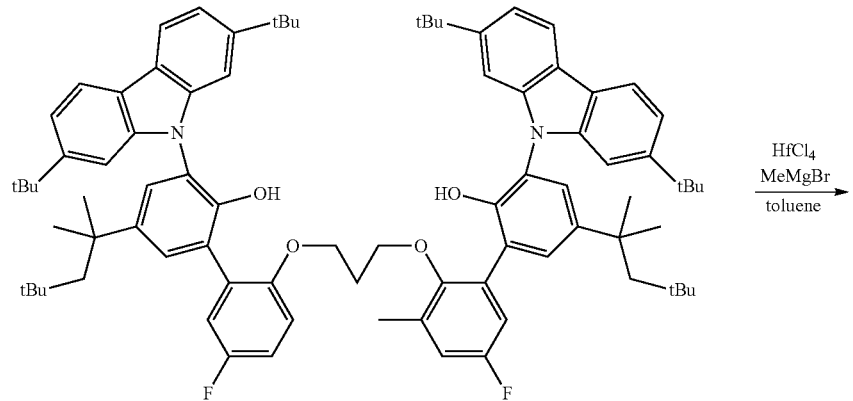

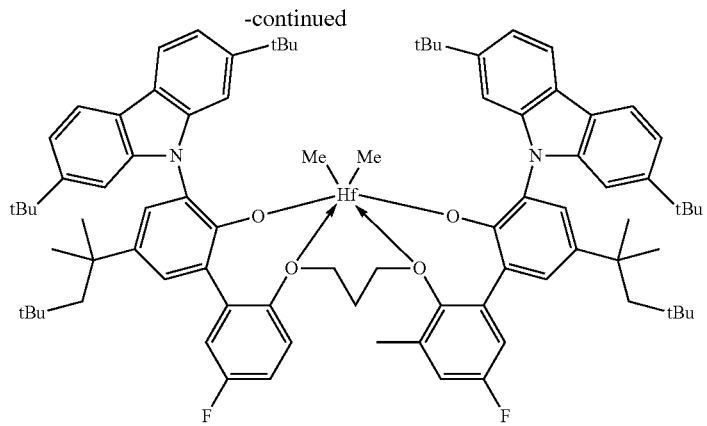

Procatalyst 6

To a cold (−25° C.) slurry of HfCl₄ (0.1033 g, 0.3225 mmol) and toluene (20 mL) is added 3.0 M MeMgBr in diethyl ether (0.45 mL, 1.35 mmol) and agitated vigorously for 2 min. To the mixture is added the ligand (0.4000 g, 0.3221 mmol) as a solid, rinsing with toluene (2.0 mL). After stirring for 1.5 h, the reaction mixture is filtered using a fritted medium funnel. The cake is washed with two 10-mL portions of toluene. To the colorless filtrate is added hexanes (5 mL) and concentrated under vacuum to afford a white solid. To the solid is added toluene (30 mL) and stirred until almost all of the solid goes into solution. Then hexanes (25 mL) is added. The cloudy yellowish solution is filtered (syringe filter) and concentrated under high vacuum to afford 0.4317 g of product as a tan colored solid.

EXAMPLE 11

(a) Step 1: Preparation of 2-(3-(2,4-difluoro-6-iodo-phenoxy)propoxy)-5-fluoro-1-iodo-3-methylbenzene A mixture of 2-(3-bromopropoxy)-1,5-difluoro-3-iodo-benzene (4.00 g, 10.61 mmol), 4-fluoro-2-iodo-6-methyl-phenol (2.674 g, 10.61 mmol) [prepared according to US2011/0282018], potassium carbonate (3.094 g, 22.39 mmol), and acetone (80 mL) is heated to reflux and allowed to stir overnight. The reaction is cooled to room temperature, filtered, washed solids with acetone, and concentrated to afford a dark brown oil. The oil is mixed with acetonitrile and allowed to crystallize in the freezer. After filtration, the brown solid is vacuum dried to afford 4.47 g (76.9%) of the product.

(b) Step 2: Preparation of 3-(2,7-di-tert-butyl-9H-carbazol-9-yl)-2'-(3-((3'-(2,7-di-tert-butyl-9H-carba-zol-9-yl)-3,5-difluoro-2'-hydroxy-5'-(2,4,4-trimethyl-pentan-2-yl)-[1,1'-biphenyl]-2-yl)oxy)propoxy)-5'-fluoro-3'-methyl-5-(2,4,4-trimethylpentan-2-yl)-[1,1'-biphenyl]-2-ol

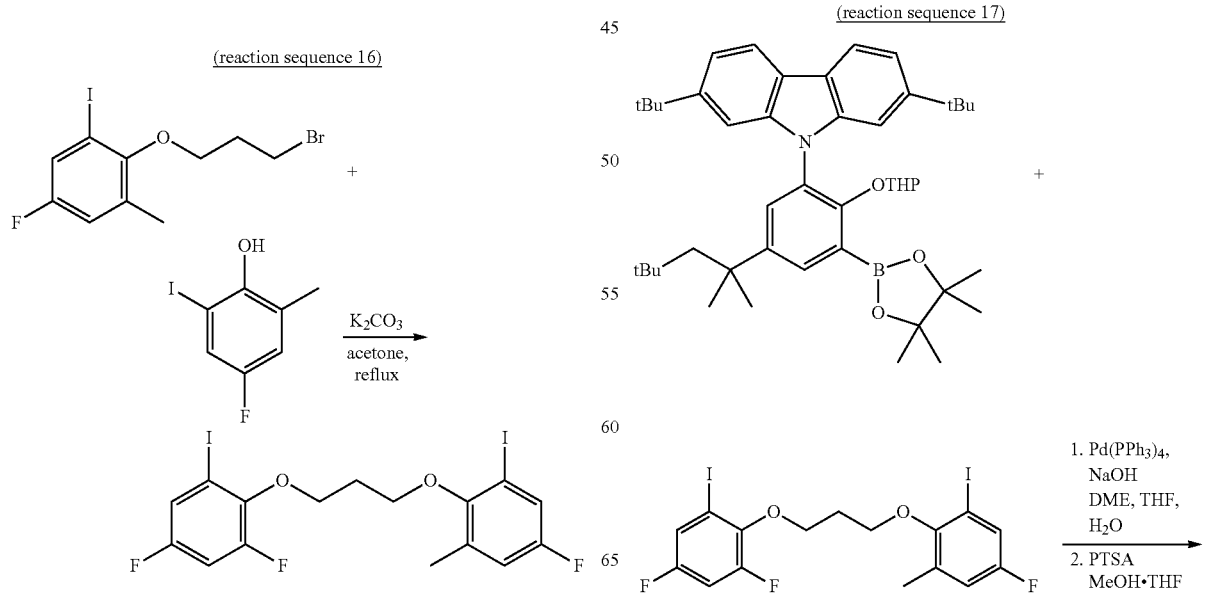

-continued

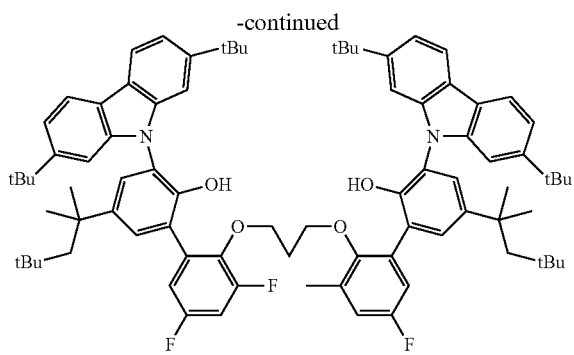

A mixture of 1,2-dimethoxyethane (60 mL) is added 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.50 g, 4.69 mmol), 2-(3-(2,4-difluoro-6-iodophenoxy)propoxy)-5-fluoro-1-iodo-3-methylbenzene (1.246 g, 2.228 mmol), a solution of NaOH (0.563 g, 14.08 mmol) in water (14 mL) and THF (35 mL) is purged with $N_2$ for 15 min, then $Pd(PPh_3)_4$ (0.1083 g, 0.0983 mmol) is added and heated to 85° C. overnight. The mixture is allowed to cool and methylene chloride (200 mL) is added, then washed with brine (200 mL), dried over anhydrous $MgSO_4$, filtered through a pad of silica gel, and concentrated to afford the crude protected ligand. To the crude is added THF (50 mL), MeOH (50 mL) and about 100 mg of PTSA until the solution is acidic by pH paper. The solution is heated to 60° C. overnight, then cooled and concentrated. To the crude is then added methylene chloride (200 mL), washed with brine (200 mL), dried over anhydrous $MgSO_4$, filtered through a pad of silica gel, and concentrated to afford a brown crystalline powder. The solid is purified by two flash column chromatography elutions with a gradient of hexanes:ethyl acetate for the first column and a gradient of methylene chloride:hexanes for the second column to afford 1.42 g (50.6%) of the ligand as white crystals.

(c) Step 3: Formation of the Metal-Ligand Complex (reaction sequence 18)

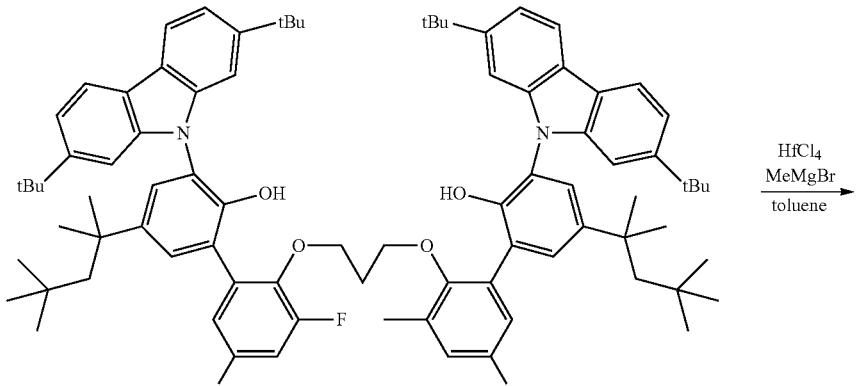

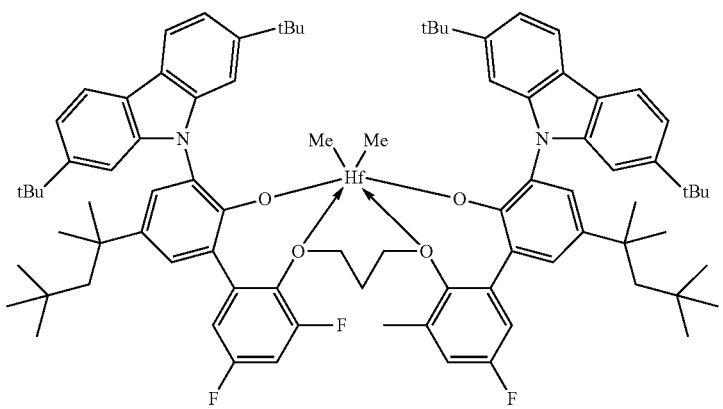

Procatalyst 7

To a cold (−25° C.) slurry of HfCl$_4$ (0.1031 g, 0.3219 mmol) and toluene (20 mL) is added 3.0 M MeMgBr in diethyl ether (0.45 mL, 1.35 mmol). The mixture is vigorously agitated for 2 min and the ligand (0.4012 g, 0.3185 mmol) is added as a solid, rinsing with toluene (3.0 mL). The reaction mixture is stirred at room temperature for 2 h. To the yellowish mixture is added a mixture of hexanes (20 mL) and filtered. The filtrate, a colorless solution, is concentrated under high vacuum. To the solid is added the mixture of hexanes (10 mL) and stirred for about 10 min. The solid is collected by filtration and dried to afford a mixture of the desired product and a minor component attributed to insufficient alkylation. The filtrate is concentrated and re-combined with the solid. The mixture is dissolved in toluene (15 mL) and 3.0 M MeMgBr (0.10 mL, 0.30 mmol) is added. The mixture is stirred for 1 h, filtered and concentrated. The brown solid is dissolved in toluene (15 mL), and the hexanes are added (25 mL). The cloudy solution is filtered and concentrated to give a tan colored solid. To the solid is added the mixture of hexanes (30 mL) and agitated vigorously for 1 h. The white solid is collected and dried under high vacuum to afford 0.2228 g (47.7%) of the product.

EXAMPLE 12

(a) Step 1: Preparation of 2',2'''-(propane-1,3-diylbis(oxy))bis(3-(2,7-di-tert-butyl-9H-carbazol-9-yl)-5'-fluoro-3'-methyl-5-(2,4,4-trimethylpentan-2-yl)-[1,1'-biphenyl]-2-ol)

(reaction sequence 19)

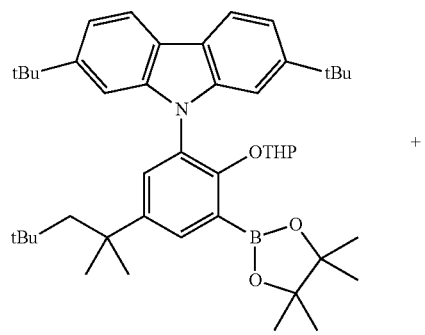

+

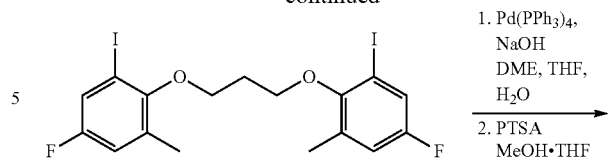

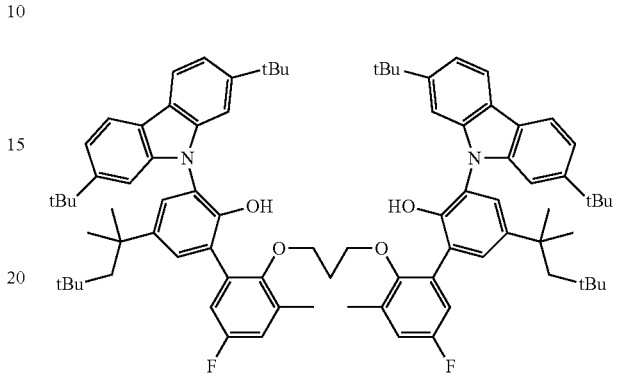

A mixture of 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (7.52 g, 9.89 mmol adjusted based on a purity of 91.2% by HPLC), 1,2-dimethoxyethane (120 mL), a solution of NaOH (1.30 g, 32.5 mmol) in water (35 mL), THF (60 mL), and 1,3-bis(4-fluoro-2-iodo-6-methylphenoxy)propane (2.56 g, 4.70 mmol) [prepared according to US 2011/0282018] is purged with N$_2$ for approximately 15 minutes and Pd(PPh$_3$)$_4$ (303 mg, 0.26 mmol) is added. The mixture is heated to reflux for 48 h, then allowed to cool to room temperature. Once cooled a precipitate is formed which is isolated and dried under high vacuum for 1 h to afford 6.10 g of crude protected ligand. To the crude is added a mixture of 1:1 MeOH/THF (200 mL) and approximately 100 mg of PTSA. The solution is heated at 60° C. for 8 h, then allowed to cool and concentrated. To the residue is added methylene chloride (250 mL), washed with brine (250 mL), dried over anhydrous MgSO$_4$, filtered through a pad of silica gel, then concentrated to afford 4.92 g of crude ligand. This crude is purified by flash chromatography eluting with 2% ethyl acetate in hexanes to afford 4.23 g (71.7%) of product as white powder.

(b) Step 2: Formation of Metal-Ligand Complex (reaction sequence 20)

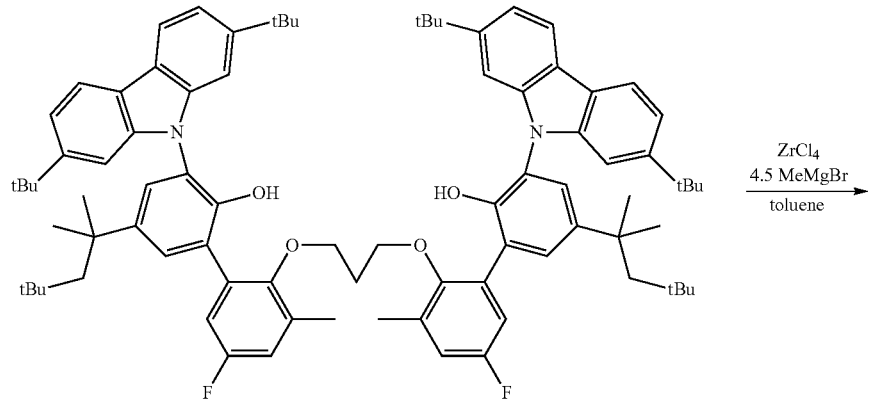

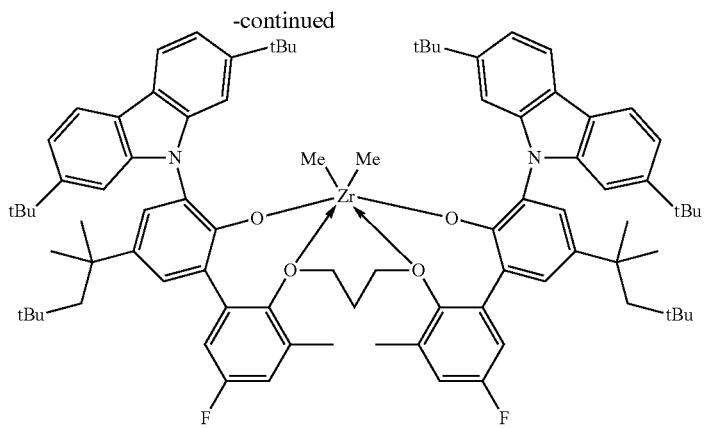

Procatalyst 8

To a cold (−30° C.) toluene solution (30 mL) of ligand and ZrCl₄ is added 3M MeMgBr in diethyl ether (4.1 mL, 12.3 mmol). After stirring overnight, the black suspension is filtered using a medium glass frit, giving a colorless solution. Solvent is removed under reduced pressure, giving 0.456 g (61.7%) of product as white solid.

EXAMPLE 13

(a) Step 1: Preparation of Ligand (reaction sequence 21)

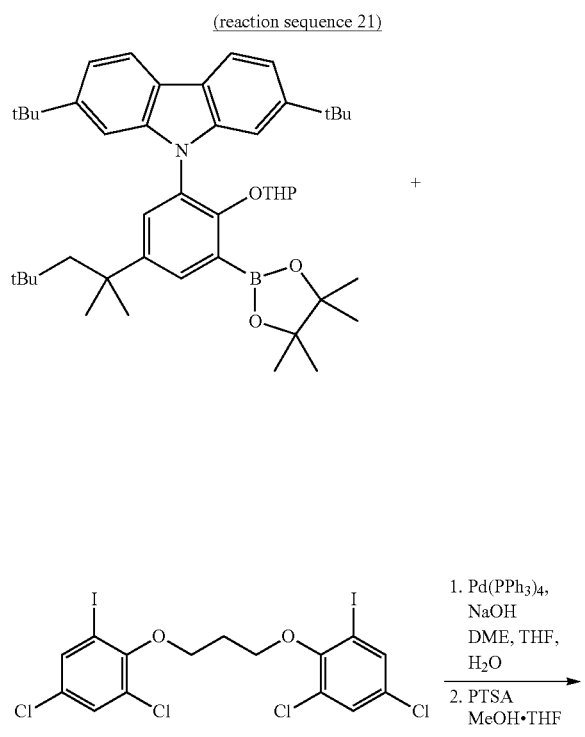

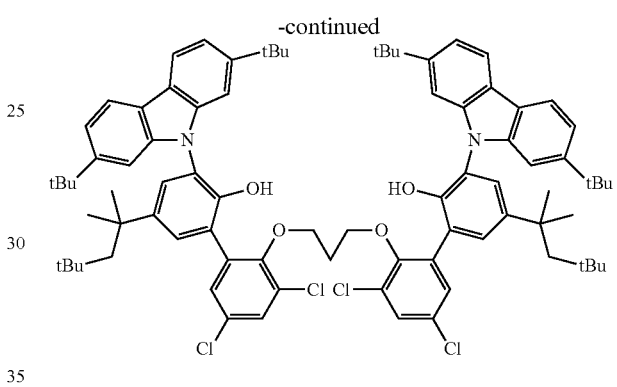

A mixture of 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.50 g, 5.16 mmol), 1,2-dimethoxyethane (200 mL), a solution of NaOH (0.62 g, 15.47 mmol) in water (60 mL), THF (60 mL), and 1,3-bis(2,4-dichloro-6-iodophenoxy)propane (1.51 g, 2.45 mmol) [prepared according to US 2011/0282018] is purged with N₂ for approximately 15 min and Pd(PPh₃)₄ (0.12 g, 0.10 mmol) is added. The mixture is heated to reflux for 48 h, then allowed to cool and concentrated. To the residue is added methylene chloride (200 mL), washed with brine (200 mL), dried over anhydrous MgSO₄, filtered through a pad of silica, and concentrated to afford the crude protected ligand. The crude is dissolved in a mixture of THF (100 mL) and MeOH (100 mL), heated to 60° C. and PTSA is added until the solution becomes acidic (pH paper). The mixture is stirred at 60° C. for 8 h, then allowed to cool to room temperature and concentrated. To the residue is added methylene chloride (200 mL), washed with brine (200 mL), dried over anhydrous MgSO₄, filtered through a pad of silica gel, and concentrated to give the crude ligand. The crude is purified via flash chromatography eluting with 40% methylene chloride in hexanes to afford 2.57 g (78.9%) of the ligand as a white powder.

(b) Step 2: Formation of Metal-Ligand Complex

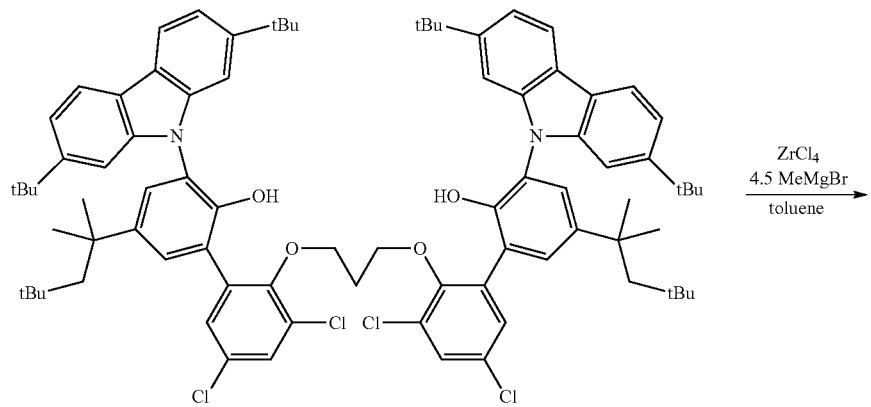

(reaction sequence 22)

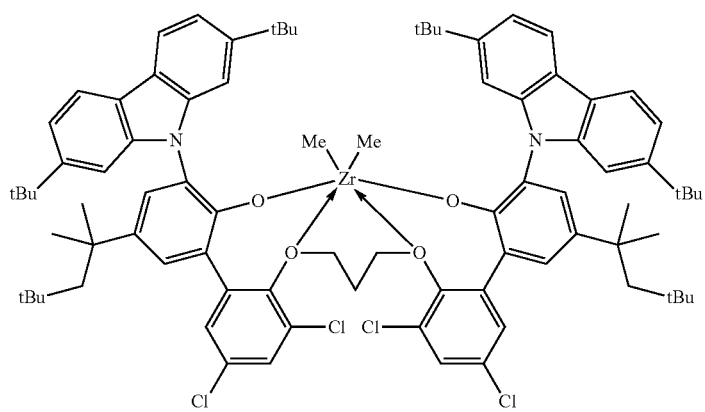

Procatalyst 9

To cold toluene (20 mL) containing ZrCl₄ (0.105 g, 0.45 mmol) is added 3.0 M MeMgBr in diethyl ether (0.63 mL, 1.90 mmol). After stirring for 3 min, the ligand (0.60 g, 0.45 mmol) is added as a solid. After stirring for 2 h, hexanes (20 mL) is added and the black suspension is filtrated. Solvent is removed under reduced pressure, giving an off-white solid. To this solid is added hexanes (20 mL) and stirred for 10 min. Product is collected on the frit, washed with hexanes (5 mL) and dried under reduced pressure to give (0.5032 g, 77%) of white solid.

EXAMPLE 14

Preparation of the Fluoro Analog of Catalyst 9:

(a) Step 1: Preparation of the Ligand (reaction sequence 23)

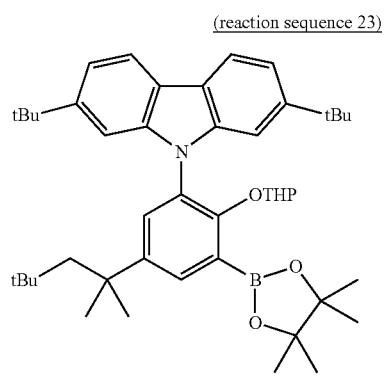

+

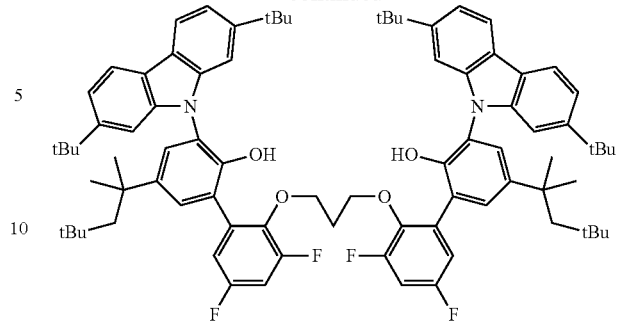

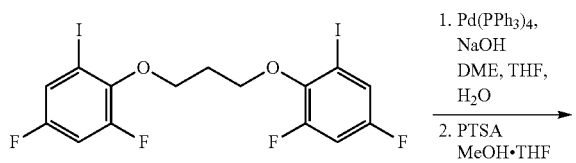

A mixture of 1,2-dimethoxyethane (50 mL), 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.068 g, 4.17 mmol), 1,3-bis(2,4-difluoro-6-iodophenoxy)propane (1.05 g, 1.98 mmol) [prepared according to US 2011/0282018], a solution of NaOH (0.56 g, 14.0 mmol) in water (14 mL), and THF (14 mL) is purged with $N_2$ for about 15 min, then $Pd(PPh_3)_4$ (145 mg, 0.13 mmol) is added. The reaction mixture is heated to 85° C. for 36 h, then cooled. Once cooled a precipitate is formed which is isolated and dried under high vacuum for 2 h, resulting in crude protected ligand. To the crude is added a 1:1 mixture of THF:MeOH (50 mL) and approximately 100 mg of PTSA. The solution is heated to 60° C. for 8 h, then cooled and concentrated. To the residue is added methylene chloride (200 mL), washed with brine (200 mL), dried over anhydrous $MgSO_4$, filtered through a pad of silica gel, and concentrated. The residue is dissolved in hexanes and purified by flash column chromatography using a gradient of 2-5% ethyl acetate in hexanes to afford 1.80 g (72.0%) of the product as a white powder.

(b) Step 2: Formation of Metal-Ligand Complex (reaction sequence 24)

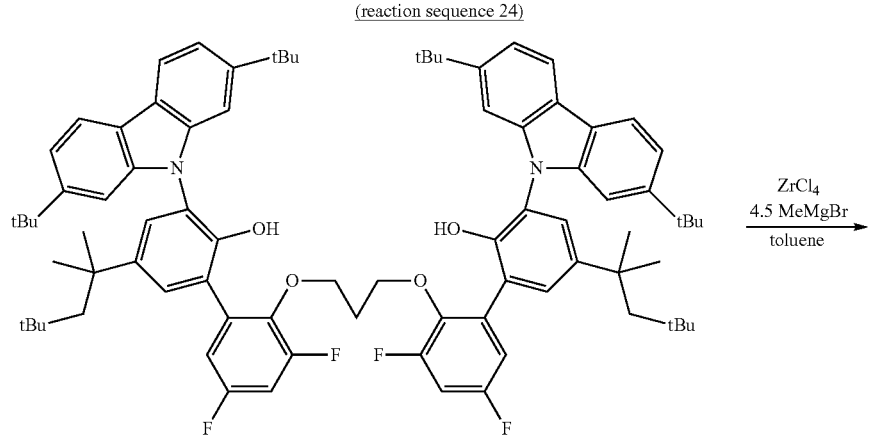

-continued

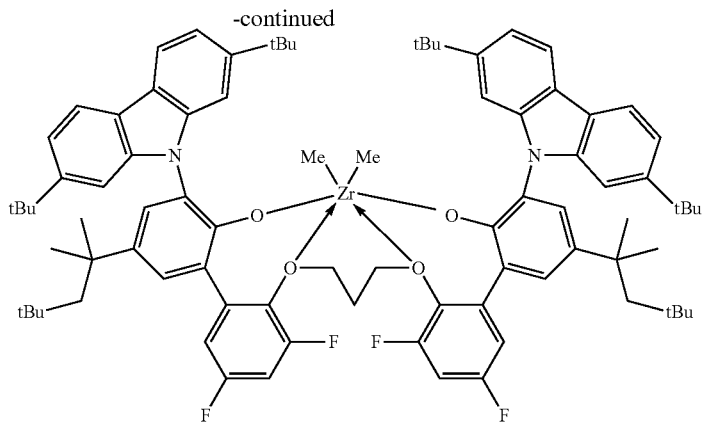

Procatalyst 10

To cold toluene (30 mL) containing $ZrCl_4$ (0.055 g, 0.24 mmol) is added 3.0 M MeMgBr in diethyl ether (0.33 mL, 1.0 mmol). After stirring for 5 min, the ligand (0.300 g, 0.24 mmol) is added as a solid. After stirring for 1 h, an amount of hexane (15 mL) is added and the black suspension is filtrated. Solvent is removed under reduced pressure, giving 0.312 g (85.6%) of product as white solid.

The invention claimed is:

1. A process for preparing an olefin homopolymer or copolymer, comprising contacting ethylene, an alpha-olefin, or a combination thereof, and a catalytic amount of a metal-ligand complex catalyst of the formula (I):

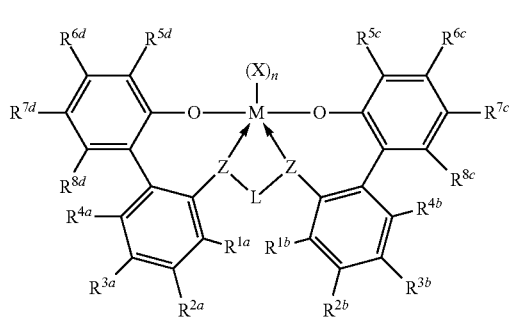

(I)

where

M is titanium, zirconium, or hafnium and has a formal oxidation state of +2, +3, or +4;

n is 0, 1, or 2;

when n is 1, X is a monodentate ligand or a bidentate ligand;

when n is 2, each X is an independently chosen monodentate ligand;

the metal-ligand complex is overall charge-neutral;

each Z is independently chosen from —O—, —S—, —N($R^N$)—, or —P($R^P$)—;

L is ($C_1$-$C_{40}$)hydrocarbylene or ($C_1$-$C_{40}$)heterohydrocarbylene, provided such has a portion that comprises a 2- to 8-carbon atom linker backbone linking the Z moieties, each atom of such 2- to 8-atom linker being independently a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_9$) alkylene, each $R^P$ is unsubstituted ($C_1$-$C_{18}$)hydrocarbyl; and each $R^N$ is unsubstituted ($C_1$-$C_{18}$)hydrocarbyl, or a hydrogen atom;

$R^{1a}$ and $R^{1b}$ are independently a halogen atom or a hydrogen atom, provided that at least one of $R^{1a}$ and $R^{1b}$ is a halogen atom;

$R^{2a}$, $R^{3a}$, $R^{4a}$, $R^{2b}$, $R^{3b}$, $R^{4b}$, $R^{6c}$, $R^{7c}$, $R^{8c}$, $R^{6d}$, $R^{7d}$, and $R^{8d}$ independently is a hydrogen atom; ($C_1$-$C_{40}$)hydrocarbyl; ($C_1$-$C_{40}$)heterohydrocarbyl; Si($R^C$)$_3$, Ge($R^C$)$_3$, P($R^P$)$_2$, N($R^N$)$_2$, O$R^C$, S$R^C$, NO$_2$, CN, F$_3$C, F$_3$CO, RCS(O)—, RCS(O)$_2$—, (RC)$_2$C=N—, RCC(O)O—, RCOC(O)—, RCC(O)N(R)—, (RC)$_2$NC(O)—, or halogen atom;

and $R^{5c}$ and $R^{5d}$ independently is independently selected from: phenanthren-9-yl; 2,3-dihydro-1H-inden-6-yl; naphthalene-2-yl; 2,6-diethylphenyl; 2,6-diphenylphenyl; 3,5-dimethylphenyl; 3,5-bis(tri-fluoromethyl)phenyl; 3,5-bis(1-methylethyl)phenyl; 2,4,6-trimethylphenyl; and 2,4,6-tris(1-methylethyl)phenyl); 1-methyl-2,3-dihydro-1H-inden-6-yl; 1,1-dimethyl-2,3-dihydro-1H-inden-6-yl; 1-methyl-1,2,3,4-tetrahydronaphthalen-5-yl; 1,1-dimethyl-1,2,3,4-tetrahydronaphthalen-5-yl; 3,6-di(tertiary-octyl)-carbazolyl; 3,6-di(tertiary-octyl)-carbazol-9-yl; 3,6-diphenylcarbazol-9-yl; 3,6-bis(2,4,6-trimethylphenyl)-carbazol-9-yl; quinolin-4-yl; quinolin-5-yl; quinolin-8-yl; 1,2,3,4-tetrahydroquinolin-1-yl; isoquinolin-1-yl; isoquinolin-4-yl; isoquinolin-5-yl; isoquinolin-8-yl; 1,2,3,4-tetrahydroisoquinolin-2-yl; 1H-indol-1-yl; 1H-indolin-1-yl; 1,2,3,4-tetrahydrocarbazolyl-9-yl; 1,2,3,4,5,6,7,8-octahydrocarbazolyl-9-yl; 4,6-bis(1,1-dimethylethyl)pyridine-2-yl; 4,6-diphenylpyridin-2-yl; 3-phenyl-1H-indol-1-yl; 3-(1,1-dimethylethyl)-1H-indol-1-yl; 3,6-diphenyl-9H-carbazol-9-yl; 3,6-di(1-methylethyl)-9H-carbazol-9-yl; 3,6-dimethyl-9H-carbazol-9-yl; 3,6-diethyl-9H-carbazol-9-yl; 3,6-bis[2',4',6'-tris(1,1-dimethylphenyl)]-9H-carbazol-9-yl; 3,6-di(tertiary-butyl)-carbazol-9-yl, provided that when $R^{5c}$ and $R^{5d}$ are 3,6-di(tertiary-butyl)-carbazol-9-yl, $R^{1a}$ or $R^{1b}$ is —H;

under conditions such that an ethylene homopolymer, an alpha-olefin homopolymer, or an ethylene/alpha-olefin copolymer is formed, such having a weight average molecular weight that is reduced by at least 20 percent when compared with an otherwise identical ethylene homopolymer, alpha-olefin homopolymer or ethylene/alpha-olefin copolymer prepared under identical conditions with a catalyst that is otherwise identical but wherein neither $R^{1a}$ nor $R^{1b}$ is a halogen atom.

2. The process of claim 1 wherein $R^{1a}$, $R^{1b}$, or both is independently a halogen atom chosen from fluorine, chlorine, or iodine.

3. The process of claim 1 wherein the alpha-olefin is selected from the group consisting of (A) linear alpha-olefins having from 3 to 12 carbons, (B) branched alpha-olefins having from 5 to 16 carbons, and both (A) and (B).

4. The process of claim 1, wherein $R^{2a}$, $R^{2b}$, $R^{3a}$, $R^{3b}$, $R^{4a}$, $R^{4b}$ are hydrogen.

5. A process for preparing an olefin homopolymer or copolymer, comprising contacting ethylene, an alpha-olefin, or a combination thereof, and a catalytic amount of a metal-ligand complex catalyst of the formula (I):

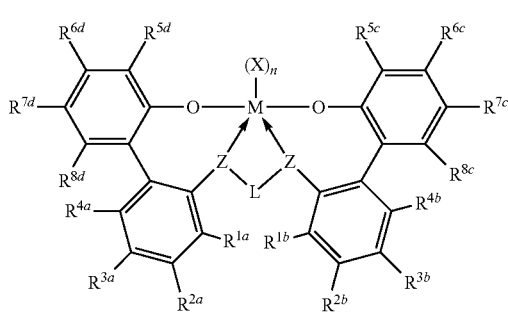

(I)

where
M is titanium, zirconium, or hafnium and has a formal oxidation state of +2, +3, or +4;
n is 0, 1, or 2;
when n is 1, X is a monodentate ligand or a bidentate ligand;
when n is 2, each X is an independently chosen monodentate ligand;
the metal-ligand complex is overall charge-neutral;
each Z is independently chosen from —O—, —S—, —N($R^N$)—, or —P($R^P$)—;
L is $(C_1-C_{40})$hydrocarbylene or $(C_1-C_{40})$heterohydrocarbylene, provided such has a portion that comprises a 2- to 8-carbon atom linker backbone linking the Z moieties, each atom of such 2- to 8-atom linker being independently a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted $(C_1-C_{18})$hydrocarbyl or the two $R^C$ are taken together to form a $(C_2-C_9)$alkylene, each $R^P$ is unsubstituted $(C_1-C_{18})$hydrocarbyl; and each $R^N$ is unsubstituted $(C_1-C_{18})$hydrocarbyl, a hydrogen atom;
one of $R^{1a}$ and $R^{1b}$ is halogen, and the other is methyl or hydrogen;
$R^{2a}$, $R^{3a}$, $R^{4a}$, $R^{2b}$, $R^{3b}$, $R^{4b}$, $R^{6c}$, $R^{7c}$, $R^{8c}$, $R^{6d}$, $R^{7d}$, and $R^{8d}$ independently is a hydrogen atom; $(C_1-C_{40})$ $F_3CO$—, $R_3Si$—, $R_3Ge$—, RO—, RS—, RS(O)—, RS(O)$_2$—, $R_2P$—, $R_2N$—, $R_2C$=N—, NC—, RC(O)O—, ROC(O)—, RC(O)N(R)—, or $R_2NC(O)$—, or two of the $R^S$ are taken together to form an unsubstituted $(C_1-C_{18})$alkylene, wherein each $R^S$ independently is an unsubstituted $(C_1-C_{18})$alkyl;
$R^{5c}$ and $R^{5d}$ are independently a $(C_6-C_{40})$aryl or $(C_1-C_{40})$heteroaryl; and each of the aryl, heteroaryl, hydrocarbyl, hydrocarbylene, and heterohydrocarbylene groups is independently unsubstituted or substituted with one or more substituents $R^S$; and each $R^S$ is independently a halogen atom, polyfluoro substitution, perfluoro substitution, unsubstituted $(C_1-C_{18})$alkyl, $F_3C$—, $FCH_2O$—, $F_2HCO$—,
under conditions such that an ethylene homopolymer, an alpha-olefin homopolymer, or an ethylene/alpha-olefin copolymer is formed, such having a weight average molecular weight that is reduced by at least 20 percent when compared with an otherwise identical ethylene homopolymer, alpha-olefin homopolymer or ethylene/alpha-olefin copolymer prepared under identical conditions with a catalyst that is otherwise identical but wherein neither $R^{1a}$ nor $R^{1b}$ is a halogen atom.

6. The process of claim 5 wherein $R^{1a}$ or $R^{1b}$ is a halogen atom chosen from fluorine, chlorine, or iodine.

7. The process of claim 5 wherein the alpha-olefin is selected from the group consisting of (A) linear alpha-olefins having from 3 to 12 carbons, (B) branched alpha-olefins having from 5 to 16 carbons, and both (A) and (B).

8. The process of claim 5, wherein $R^{2a}$, $R^{2b}$, $R^{3a}$, $R^{3b}$, $R^{4a}$, $R^{4b}$ are hydrogen.

9. The process of claim 5, wherein the metal-ligand complex catalyst of the formula (I) is:

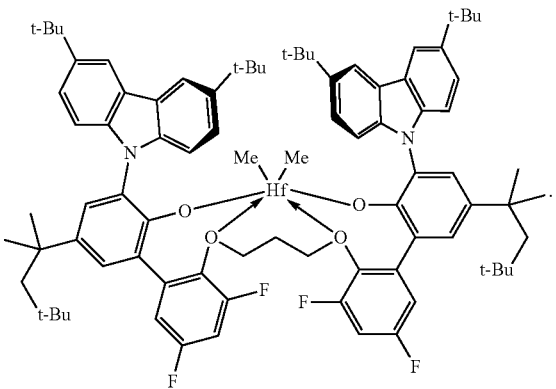

10. The process of claim 5, wherein the metal-ligand complex catalyst of the formula (I) is:

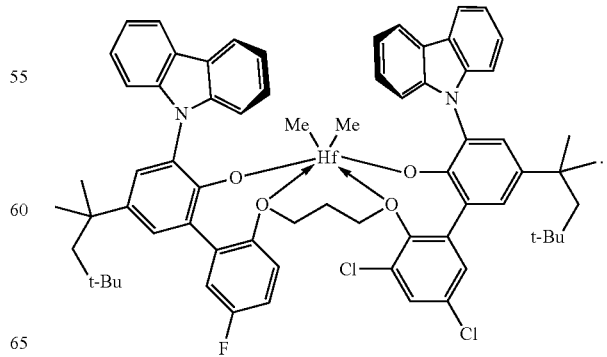

11. The process of claim 5, wherein the metal-ligand complex catalyst of the formula (I) is:
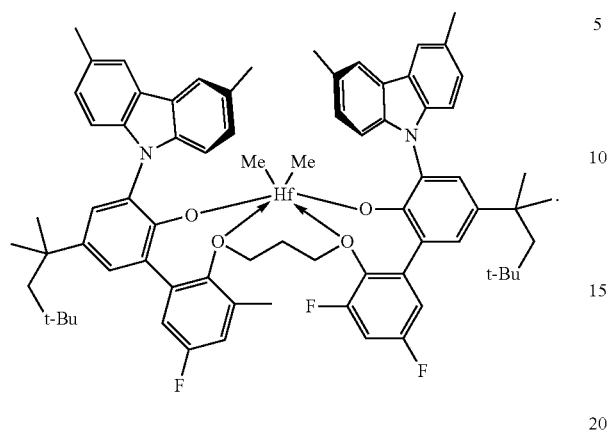

UNITED STATES PATENT AND TRADEMARK OFFICE
CERTIFICATE OF CORRECTION

PATENT NO. : 10,144,791 B2
APPLICATION NO. : 15/433198
DATED : December 4, 2018
INVENTOR(S) : Jerzy Klosin, Ruth Figueroa and Robert D J Froese Page 1 of 1

It is certified that error appears in the above-identified patent and that said Letters Patent is hereby corrected as shown below:

In the Claims

Column 46, Claim 9:

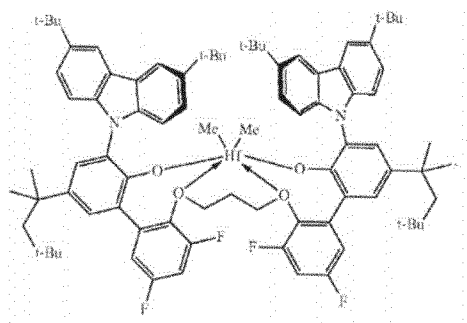

Should read:

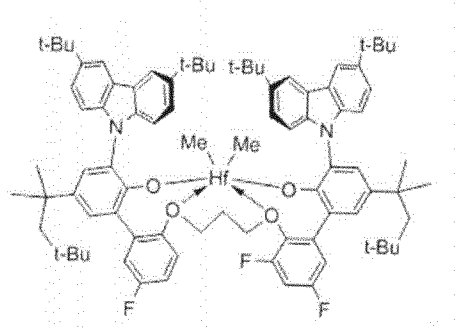

Signed and Sealed this
Fourteenth Day of May, 2019

Andrei Iancu
*Director of the United States Patent and Trademark Office*